(12) United States Patent
Everhart

(10) Patent No.: US 9,240,089 B2
(45) Date of Patent: Jan. 19, 2016

(54) SYSTEMS AND METHODS FOR TIME VARIABLE FINANCIAL AUTHENTICATION

(75) Inventor: Glenn Cobourm Everhart, Smyrna, DE (US)

(73) Assignee: JPMorgan Chase Bank, N.A., New York, NY (US)

(*) Notice: Subject to any disclaimer, the term of this patent is extended or adjusted under 35 U.S.C. 154(b) by 570 days.

(21) Appl. No.: 12/495,006

(22) Filed: Jun. 30, 2009

(65) Prior Publication Data
US 2009/0271853 A1 Oct. 29, 2009

Related U.S. Application Data

(63) Continuation of application No. 10/419,107, filed on Apr. 21, 2003, now Pat. No. 7,899,753, which is a continuation-in-part of application No. 10/105,471, filed on Mar. 25, 2002, now abandoned.

(51) Int. Cl.
H04L 9/32 (2006.01)
G07F 7/10 (2006.01)
(Continued)

(52) U.S. Cl.
CPC .......... G07F 7/1008 (2013.01); G06Q 20/0855 (2013.01); G06Q 20/341 (2013.01);
(Continued)

(58) Field of Classification Search
CPC ... G06Q 20/00; G06Q 20/0855; G06Q 20/08; G06Q 20/085; G06Q 20/341; G06Q 20/30; G06Q 20/36; G06Q 20/367; G06Q 20/34; G06Q 20/3674; G06Q 20/382; G06Q 20/38; G06Q 20/388; G06Q 20/40; G06Q 20/401; G06Q 20/40975; G06Q 20/409; G06Q 20/4097; G07F 7/00; G07F 7/08; G07F 7/008; G07F 7/10; G07F 7/1016; G06F 21/00; G06F 21/30; G06F 21/60; G06F 21/604

USPC ............................................................ 726/6
See application file for complete search history.

(56) References Cited

U.S. PATENT DOCUMENTS 3,634,669 A  1/1972  Soumas
3,653,480 A  4/1972  Yamamoto
(Continued)

FOREIGN PATENT DOCUMENTS

CA   2293321    12/1998
DE   197 31 293   1/1999
(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.
(Continued)

Primary Examiner — William Goodchild
(74) Attorney, Agent, or Firm — Hunton & Williams LLP

(57) ABSTRACT

The systems and methods of the invention provide a technique for authenticating a finance related transaction. The method may include providing a token which contains a token counter, the token counter periodically advancing to generate a changing token value, the token counter being synchronized to a base counter that generates an authenticating value; transforming the token value into a token output sequence using logic; and outputting at least part of the token output sequence to an authenticating authority, the authenticating authority having access to the authenticating value. Further, the method includes the authenticating authority verifying the validity of the transaction based on the token output sequence and the authenticating value, from which the authenticating authority obtains a verification sequence using the logic, the verifying the validity including the authenticating authority comparing the token output sequence to the verification sequence to determine if there is a match between the token output sequence and the verification sequence.

22 Claims, 10 Drawing Sheets

(51) Int. Cl.
*G06Q 20/08* (2012.01)
*G06Q 20/34* (2012.01)
*G06Q 20/36* (2012.01)
*G06Q 20/38* (2012.01)
*G06Q 20/40* (2012.01)

(52) U.S. Cl.
CPC .......... *G06Q20/3674* (2013.01); *G06Q 20/382* (2013.01); *G06Q 20/388* (2013.01); *G06Q 20/40* (2013.01); *G06Q 20/401* (2013.01); *G06Q 20/40975* (2013.01); *G07F 7/1016* (2013.01)

(56) References Cited

U.S. PATENT DOCUMENTS

| | | |
|---|---|---|
| 3,665,162 A | 5/1972 | Yamamoto |
| 3,713,235 A | 1/1973 | Roberts |
| 3,946,206 A | 3/1976 | Darjany |
| 4,047,033 A | 9/1977 | Malmberg et al. |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| 4,200,770 A | 4/1980 | Hellman et al. |
| 4,218,582 A | 8/1980 | Hellman et al. |
| 4,223,403 A | 9/1980 | Konheim et al. |
| 4,321,672 A | 3/1982 | Braun |
| 4,338,587 A | 7/1982 | Chiappetti |
| 4,396,985 A | 8/1983 | Ohara |
| 4,424,414 A | 1/1984 | Hellman et al. |
| 4,453,074 A | 6/1984 | Weinstein |
| 4,454,414 A | 6/1984 | Benton |
| 4,465,206 A | 8/1984 | Sorel et al. |
| 4,523,087 A | 6/1985 | Benton |
| 4,529,870 A * | 7/1985 | Chaum ........................ 235/380 |
| 4,545,838 A | 10/1985 | Minkus et al. |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,633,036 A | 12/1986 | Hellman et al. |
| 4,634,845 A | 1/1987 | Riley |
| 4,643,452 A | 2/1987 | Chang et al. |
| 4,650,981 A | 3/1987 | Foletta |
| 4,672,377 A | 6/1987 | Murphy |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,746,787 A | 5/1988 | Okada |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,797,913 A | 1/1989 | Kaplan |
| 4,799,156 A | 1/1989 | Shavit |
| 4,812,628 A | 3/1989 | Boston |
| 4,822,985 A | 4/1989 | Boggan et al. |
| 4,823,264 A | 4/1989 | Deming |
| 4,831,242 A | 5/1989 | Englehardt |
| 4,831,526 A | 5/1989 | Luchs |
| 4,837,422 A | 6/1989 | Dethloff et al. |
| 4,851,650 A | 7/1989 | Kitade |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,988,849 A | 1/1991 | Sasaki |
| 4,992,940 A | 2/1991 | Dworkin |
| 5,023,904 A | 6/1991 | Kaplan |
| 5,025,372 A | 6/1991 | Burton et al. |
| 5,049,728 A | 9/1991 | Rovin |
| 5,053,607 A | 10/1991 | Carrlson |
| 5,054,096 A | 10/1991 | Beizer |
| 5,055,662 A | 10/1991 | Hasegawa |
| 5,080,748 A | 1/1992 | Bonomi |
| 5,095,194 A | 3/1992 | Barbanell |
| 5,097,115 A | 3/1992 | Ogasawara et al. |
| 5,111,395 A | 5/1992 | Smith |
| 5,117,355 A | 5/1992 | McCarthy |
| 5,146,068 A | 9/1992 | Ugawa et al. |
| 5,163,098 A | 11/1992 | Duhbura |
| 5,175,416 A | 12/1992 | Mansvelt |
| 5,175,682 A | 12/1992 | Higashiyama |
| 5,177,342 A | 1/1993 | Adams |
| 5,180,901 A | 1/1993 | Hiramatsu |
| 5,185,697 A | 2/1993 | Jacobs et al. |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,225,664 A | 7/1993 | Lijima |
| 5,225,978 A | 7/1993 | Peterson |
| 5,237,159 A | 8/1993 | Stephens |
| 5,237,620 A | 8/1993 | Deaton |
| 5,247,190 A | 9/1993 | Friend et al. |
| 5,276,311 A | 1/1994 | Hennige |
| 5,283,829 A | 2/1994 | Anderson |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,317,636 A * | 5/1994 | Vizcaino ........................ 705/65 |
| 5,326,959 A | 7/1994 | Perazza |
| 5,326,960 A | 7/1994 | Tannenbaum |
| 5,328,809 A | 7/1994 | Holmes et al. |
| 5,336,870 A | 8/1994 | Hughes |
| 5,339,239 A | 8/1994 | Manabe et al. |
| 5,349,633 A | 9/1994 | Katz |
| 5,350,906 A | 9/1994 | Brody et al. |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,367,581 A | 11/1994 | VanHorn |
| 5,373,550 A | 12/1994 | Campbell |
| 5,380,046 A | 1/1995 | Stephens |
| 5,382,784 A | 1/1995 | Eberhardt |
| 5,383,113 A | 1/1995 | Knight |
| 5,396,417 A | 3/1995 | Burks |
| 5,397,881 A | 3/1995 | Mannik |
| 5,399,502 A | 3/1995 | Friend et al. |
| 5,401,827 A | 3/1995 | Holmes et al. |
| 5,402,474 A | 3/1995 | Miller |
| RE34,915 E | 4/1995 | Nichtberger et al. |
| 5,409,092 A | 4/1995 | Itako et al. |
| 5,412,190 A | 5/1995 | Josephson |
| 5,420,405 A | 5/1995 | Chasek |
| 5,424,524 A | 6/1995 | Ruppert et al. |
| 5,424,938 A | 6/1995 | Wagner |
| 5,430,644 A | 7/1995 | Deaton |
| 5,432,326 A | 7/1995 | Noblett et al. |
| 5,444,841 A | 8/1995 | Glaser |
| 5,446,740 A | 8/1995 | Yien |

(56) References Cited

U.S. PATENT DOCUMENTS

| | | |
|---|---|---|
| 5,448,471 A | 9/1995 | Deaton |
| 5,450,477 A | 9/1995 | Amarant et al. |
| 5,450,479 A | 9/1995 | Alesio |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,479,532 A | 12/1995 | Abel |
| 5,481,094 A | 1/1996 | Suda |
| 5,482,139 A | 1/1996 | Rivalto |
| 5,483,444 A | 1/1996 | Malark |
| 5,483,445 A | 1/1996 | Pickering |
| 5,484,988 A | 1/1996 | Hills |
| 5,489,123 A | 2/1996 | Roshkoff |
| 5,500,514 A | 3/1996 | Veeneman et al. |
| 5,503,891 A | 4/1996 | Marshall et al. |
| 5,504,677 A | 4/1996 | Pollin |
| 5,506,691 A | 4/1996 | Bednar |
| 5,511,114 A | 4/1996 | Stimson et al. |
| 5,511,184 A | 4/1996 | Lin |
| 5,512,654 A | 4/1996 | Holmes et al. |
| 5,513,102 A | 4/1996 | Auriemma |
| 5,513,250 A | 4/1996 | McAllister |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,040 A | 8/1996 | Gerbaulet |
| 5,544,086 A | 8/1996 | Davis et al. |
| 5,544,246 A | 8/1996 | Mandelbaum et al. |
| 5,550,358 A | 8/1996 | Tait |
| 5,550,734 A | 8/1996 | Tarter |
| 5,551,021 A | 8/1996 | Harada |
| 5,553,120 A | 9/1996 | Katz |
| 5,557,092 A | 9/1996 | Ackley |
| 5,563,934 A | 10/1996 | Eda |
| 5,566,330 A | 10/1996 | Sheffield |
| 5,568,489 A | 10/1996 | Yien |
| 5,577,109 A | 11/1996 | Stimson et al. |
| 5,578,808 A | 11/1996 | Taylor |
| 5,581,064 A | 12/1996 | Riley et al. |
| 5,583,759 A | 12/1996 | Geer |
| 5,583,933 A | 12/1996 | Mark |
| 5,585,787 A | 12/1996 | Wallerstein |
| 5,590,038 A | 12/1996 | Pitroda |
| 5,592,378 A | 1/1997 | Cameron |
| 5,592,553 A | 1/1997 | Guski et al. |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,613,002 A | 3/1997 | Kephart et al. |
| 5,619,558 A | 4/1997 | Jheeta |
| 5,621,201 A | 4/1997 | Langhans |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,640,577 A | 6/1997 | Scharmer |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,650,604 A | 7/1997 | Marcous |
| 5,652,786 A | 7/1997 | Rogers |
| 5,653,914 A | 8/1997 | Holmes et al. |
| 5,659,469 A | 8/1997 | Deaton |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,724,423 A | 3/1998 | Khello |
| 5,724,424 A | 3/1998 | Gifford |
| 5,726,884 A | 3/1998 | Sturgeon et al. |
| 5,727,153 A | 3/1998 | Powell |
| 5,727,249 A | 3/1998 | Pollin |
| 5,728,998 A | 3/1998 | Novis et al. |
| 5,729,693 A | 3/1998 | Holda-Fleck |
| 5,732,136 A | 3/1998 | Murphree et al. |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,555 A | 4/1998 | Mark |
| 5,745,706 A | 4/1998 | Wolfberg et al. |
| 5,748,737 A | 5/1998 | Daggar |
| 5,748,780 A | 5/1998 | Stolfo |
| 5,749,075 A | 5/1998 | Toader et al. |
| 5,760,381 A | 6/1998 | Stich et al. |
| 5,764,770 A | 6/1998 | Schipper et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holmann |
| 5,789,733 A | 8/1998 | Jachimowicz et al. |
| 5,790,636 A | 8/1998 | Marshall |
| 5,793,861 A | 8/1998 | Haigh |
| 5,794,207 A | 8/1998 | Walker et al. |
| 5,794,221 A | 8/1998 | Engendorf |
| 5,796,827 A | 8/1998 | Coppersmith et al. |
| 5,798,950 A | 8/1998 | Fitzgerald |
| 5,799,087 A | 8/1998 | Rosen |
| 5,802,176 A | 9/1998 | Audebert |

(56) References Cited

U.S. PATENT DOCUMENTS

| | | |
|---|---|---|
| 5,802,498 A | 9/1998 | Comesanas |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,236 A | 10/1998 | Josephson |
| 5,819,237 A | 10/1998 | Garman |
| 5,823,463 A | 10/1998 | Fissmann et al. |
| 5,825,871 A | 10/1998 | Mark |
| 5,826,241 A | 10/1998 | Stein |
| 5,826,243 A | 10/1998 | Musmanno et al. |
| 5,826,245 A | 10/1998 | Sandberg-Diment |
| 5,832,090 A | 11/1998 | Raspotnik |
| 5,832,211 A | 11/1998 | Blakley, III et al. |
| 5,832,457 A | 11/1998 | O'Brien |
| 5,832,460 A | 11/1998 | Bednar |
| 5,832,463 A | 11/1998 | Funk |
| 5,832,464 A | 11/1998 | Houvener |
| 5,832,488 A | 11/1998 | Eberhardt |
| 5,835,061 A | 11/1998 | Stewart |
| 5,835,576 A | 11/1998 | Katz |
| 5,835,603 A | 11/1998 | Coutts |
| 5,838,812 A | 11/1998 | Pare |
| 5,838,903 A | 11/1998 | Blakely, III et al. |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,862,323 A | 1/1999 | Blakely, III et al. |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,456 A | 2/1999 | Rogers |
| 5,870,718 A | 2/1999 | Spector |
| 5,870,721 A | 2/1999 | Norris |
| 5,870,723 A | 2/1999 | Pare |
| 5,870,725 A | 2/1999 | Bellinger |
| 5,872,917 A | 2/1999 | Hellman |
| 5,873,072 A | 2/1999 | Kight |
| 5,875,437 A | 2/1999 | Atkins |
| 5,881,151 A | 3/1999 | Yamamoto |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,884,288 A | 3/1999 | Chang |
| 5,887,065 A | 3/1999 | Audebert |
| 5,890,138 A | 3/1999 | Godin et al. |
| 5,890,140 A | 3/1999 | Clark et al. |
| 5,897,620 A | 4/1999 | Walker et al. |
| 5,897,621 A | 4/1999 | Boesch et al. |
| 5,897,625 A | 4/1999 | Gustin |
| 5,901,303 A | 5/1999 | Chew |
| 5,903,881 A | 5/1999 | Schrader |
| 5,905,246 A | 5/1999 | Fajkowski |
| 5,907,142 A | 5/1999 | Kelsey |
| 5,907,350 A | 5/1999 | Nemirofsky |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,930,778 A | 7/1999 | Geer |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,940,844 A | 8/1999 | Cahill |
| 5,943,656 A | 8/1999 | Crooks |
| 5,945,653 A | 8/1999 | Walker |
| 5,946,669 A | 8/1999 | Polk |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,963,647 A | 10/1999 | Downing |
| 5,963,648 A | 10/1999 | Rosen |
| 5,963,925 A | 10/1999 | Kolling et al. |
| 5,966,698 A | 10/1999 | Pollin |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,978,780 A | 11/1999 | Watson |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 5,999,596 A | 12/1999 | Walker et al. |
| 5,999,624 A | 12/1999 | Hopkins |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,009,442 A | 12/1999 | Chen |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,476 A | 1/2000 | Maes et al. |
| 6,016,482 A | 1/2000 | Molinari et al. |
| 6,016,954 A | 1/2000 | Abe et al. |
| 6,019,284 A | 2/2000 | Freeman et al. |
| 6,021,189 A | 2/2000 | Vu |
| 6,026,370 A | 2/2000 | Jermyn |
| 6,029,139 A | 2/2000 | Cunningham et al. |
| 6,029,144 A | 2/2000 | Barrett et al. |
| 6,029,890 A | 2/2000 | Austin |
| 6,032,136 A | 2/2000 | Brake, Jr. et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,042,006 A | 3/2000 | VanTiburg |
| 6,044,360 A | 3/2000 | Picciallo |
| 6,045,042 A | 4/2000 | Ohno |
| 6,045,050 A | 4/2000 | Ippolito et al. |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,069,968 A | 5/2000 | Shaw et al. |
| 6,070,067 A | 5/2000 | Nguyen et al. |

(56) References Cited

U.S. PATENT DOCUMENTS

| | | |
|---|---|---|
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,088,683 A | 7/2000 | Jalili |
| 6,091,817 A | 7/2000 | Bertina et al. |
| 6,092,056 A | 7/2000 | Tull, Jr. et al. |
| 6,092,192 A | 7/2000 | Kanevsky et al. |
| 6,095,412 A | 8/2000 | Bertina et al. |
| 6,095,416 A | 8/2000 | Grant et al. |
| 6,098,053 A | 8/2000 | Slater |
| 6,105,006 A | 8/2000 | Davis et al. |
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,917 A | 10/2000 | Chapin, Jr. |
| 6,144,848 A | 11/2000 | Walsh |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,163,771 A * | 12/2000 | Walker et al. ................... 705/18 |
| 6,164,533 A | 12/2000 | Barton |
| 6,167,385 A | 12/2000 | Hartley-Urquhart |
| 6,169,975 B1 | 1/2001 | White et al. |
| 6,170,058 B1 | 1/2001 | Kausik |
| 6,173,267 B1 | 1/2001 | Cairns |
| 6,182,048 B1 | 1/2001 | Osborn et al. |
| 6,182,220 B1 | 1/2001 | Chen et al. |
| 6,182,894 B1 | 2/2001 | Hackett et al. |
| 6,185,682 B1 | 2/2001 | Tang |
| 6,186,793 B1 | 2/2001 | Brubaker |
| 6,188,309 B1 | 2/2001 | Levine |
| 6,189,787 B1 | 2/2001 | Dorf |
| 6,192,113 B1 | 2/2001 | Lorsch |
| 6,192,142 B1 | 2/2001 | Pare et al. |
| 6,195,644 B1 | 2/2001 | Bowie |
| 6,195,698 B1 | 2/2001 | Lillibridge |
| 6,202,053 B1 | 3/2001 | Christiansen et al. |
| 6,209,102 B1 | 3/2001 | Hoover |
| RE37,122 E | 4/2001 | Levine et al. |
| 6,213,392 B1 | 4/2001 | Zuppicich |
| 6,219,639 B1 | 4/2001 | Bakis et al. |
| 6,223,143 B1 | 4/2001 | Weinstock et al. |
| 6,227,447 B1 | 5/2001 | Campisano |
| 6,243,688 B1 | 6/2001 | Kalina |
| 6,260,758 B1 | 7/2001 | Blumberg |
| 6,263,316 B1 | 7/2001 | Khan et al. |
| 6,263,446 B1 | 7/2001 | Kausik et al. |
| 6,265,977 B1 | 7/2001 | Vega et al. |
| 6,269,348 B1 | 7/2001 | Parre |
| 6,278,981 B1 | 8/2001 | Dembo et al. |
| 6,295,344 B1 | 9/2001 | Marshall |
| 6,295,522 B1 | 9/2001 | Boesch |
| 6,298,336 B1 | 10/2001 | Davis et al. |
| 6,302,444 B1 | 10/2001 | Cobben |
| 6,308,268 B1 | 10/2001 | Audebert |
| 6,315,195 B1 | 11/2001 | Ramachandran |
| 6,317,834 B1 | 11/2001 | Gennaro et al. |
| 6,324,524 B1 | 11/2001 | Lent et al. |
| 6,324,526 B1 | 11/2001 | D'Agostino |
| 6,330,546 B1 | 12/2001 | Gopinathan et al. |
| 6,336,099 B1 | 1/2002 | Barnett et al. |
| 6,338,048 B1 | 1/2002 | Mori |
| 6,338,049 B1 | 1/2002 | Walker |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,366,682 B1 | 4/2002 | Hoffman |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,411,933 B1 | 6/2002 | Maes et al. |
| 6,419,161 B1 | 7/2002 | Haddad |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,507,644 B1 | 1/2003 | Henderson |
| 6,507,912 B1 | 1/2003 | Matyas, Jr. et al. |
| 6,529,880 B1 | 3/2003 | McKeen et al. |
| 6,539,363 B1 | 3/2003 | Allgeier et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,580,814 B1 | 6/2003 | Ittycheriah et al. |
| 6,581,839 B1 | 6/2003 | Lasch et al. |
| D476,681 S | 7/2003 | Al Amri |
| D477,359 S | 7/2003 | Haas |
| 6,592,044 B1 | 7/2003 | Wong et al. |
| 6,601,040 B1 | 7/2003 | Kolls |
| 6,601,761 B1 | 8/2003 | Katis |
| 6,609,111 B1 | 8/2003 | Bell |
| 6,609,654 B1 | 8/2003 | Anderson et al. |
| 6,609,658 B1 | 8/2003 | Sehr |
| RE38,255 E | 9/2003 | Levine et al. |
| 6,615,189 B1 | 9/2003 | Phillips et al. |
| 6,615,190 B1 | 9/2003 | Slater |
| 6,615,352 B2 | 9/2003 | Terao |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,651,168 B1 | 11/2003 | Kao et al. |
| 6,668,321 B2 | 12/2003 | Nendell et al. |

(56) References Cited

U.S. PATENT DOCUMENTS

| | | |
|---|---|---|
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,685,088 B1 | 2/2004 | Royer |
| 6,687,222 B1 | 2/2004 | Albert et al. |
| 6,691,916 B2 | 2/2004 | Noyes |
| 6,693,544 B1 | 2/2004 | Hebbecker |
| 6,697,947 B1 | 2/2004 | Matyas, Jr. et al. |
| 6,705,518 B2 | 3/2004 | Park et al. |
| 6,718,388 B1 | 4/2004 | Yarborough et al. |
| 6,726,813 B2 | 4/2004 | Kaule et al. |
| 6,727,802 B2 | 4/2004 | Kelly |
| 6,732,919 B2 | 5/2004 | Macklin et al. |
| 6,735,695 B1 | 5/2004 | Gopalakrishnan et al. |
| 6,742,125 B1 | 5/2004 | Gabber et al. |
| 6,742,704 B2 | 6/2004 | Fitzmaurice et al. |
| 6,745,938 B2 | 6/2004 | Sullivan |
| 6,754,640 B2 | 6/2004 | Bozeman |
| 6,757,660 B2 | 6/2004 | Canada et al. |
| 6,757,710 B2 | 6/2004 | Reed |
| D495,736 S | 9/2004 | Scharf |
| 6,793,131 B2 | 9/2004 | Hogan |
| 6,793,135 B1 | 9/2004 | Ryoo |
| 6,802,008 B1 | 10/2004 | Ikefuji et al. |
| 6,804,786 B1 | 10/2004 | Chamley et al. |
| 6,805,287 B2 | 10/2004 | Bishop |
| 6,805,288 B2 | 10/2004 | Routhenstein et al. |
| 6,805,289 B2 | 10/2004 | Noriega et al. |
| 6,819,219 B1 | 11/2004 | Bolle et al. |
| 6,845,906 B2 | 1/2005 | Royer |
| 6,856,973 B1 | 2/2005 | Bott |
| 6,857,566 B2 | 2/2005 | Wankmueller |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,895,391 B1 | 5/2005 | Kausik |
| 6,901,372 B1 | 5/2005 | Helzerman |
| 6,908,030 B2 | 6/2005 | Rajasekaran et al. |
| 6,912,502 B1 | 6/2005 | Buddle et al. |
| 6,913,193 B1 | 7/2005 | Kawan |
| 6,928,427 B2 | 8/2005 | Rajasekaran et al. |
| 6,931,382 B2 | 8/2005 | Laage |
| 6,938,020 B2 | 8/2005 | Nakajama |
| 6,938,156 B2 | 8/2005 | Wheeler et al. |
| 6,950,940 B2 | 9/2005 | Wheeler et al. |
| 6,956,950 B2 | 10/2005 | Kausik |
| 6,957,337 B1 | 10/2005 | Chainer et al. |
| 6,970,830 B1 | 11/2005 | Samra et al. |
| 6,978,369 B2 | 12/2005 | Wheeler et al. |
| 6,983,381 B2 | 1/2006 | Jerdonek |
| 6,999,569 B2 | 2/2006 | Risafi et al. |
| 6,999,943 B1 | 2/2006 | Johnson et al. |
| 7,006,992 B1 | 2/2006 | Packwood |
| 7,013,293 B1 | 3/2006 | Kipnis |
| 7,020,782 B2 | 3/2006 | Rajasekaran et al. |
| 7,031,939 B1 | 4/2006 | Gallagher |
| 7,047,222 B1 | 5/2006 | Bush |
| 7,051,001 B1 | 5/2006 | Slater |
| 7,051,002 B2 | 5/2006 | Keresman, III et al. |
| 7,051,925 B2 | 5/2006 | Schwarz, Jr. |
| 7,051,929 B2 | 5/2006 | Li |
| 7,054,842 B2 | 5/2006 | James et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,082,416 B2 | 7/2006 | Anderson |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,093,282 B2 | 8/2006 | Hillhouse |
| 7,099,850 B1 | 8/2006 | Mann |
| 7,103,576 B2 | 9/2006 | Mann |
| 7,104,443 B1 | 9/2006 | Paul et al. |
| 7,107,249 B2 | 9/2006 | Dively |
| 7,111,789 B2 | 9/2006 | Rajasekaran et al. |
| 7,140,036 B2 | 11/2006 | Bhagavatula et al. |
| 7,143,174 B2 | 11/2006 | Miller et al. |
| D533,220 S | 12/2006 | Graves et al. |
| 7,149,899 B2 | 12/2006 | Pinkas |
| 7,155,614 B2 | 12/2006 | Ellmore |
| 7,163,153 B2 | 1/2007 | Blossom |
| 7,165,049 B2 | 1/2007 | Slater |
| 7,167,565 B2 | 1/2007 | Rajasekaran |
| 7,181,762 B2 | 2/2007 | Jerdonek |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,225,155 B1 | 5/2007 | Polk |
| 7,228,565 B2 | 6/2007 | Wolff et al. |
| 7,243,839 B2 | 7/2007 | Beck et al. |
| 7,249,092 B2 | 7/2007 | Dunn et al. |
| 7,249,099 B2 | 7/2007 | Ling |
| 7,252,223 B2 | 8/2007 | Schofield |
| 7,254,560 B2 | 8/2007 | Singhal |
| D551,705 S | 9/2007 | Mershon |
| 7,269,021 B2 | 9/2007 | Gundlach |
| 7,272,857 B1 | 9/2007 | Everhart |
| 7,287,695 B2 | 10/2007 | Wankmueller |
| 7,295,999 B1 | 11/2007 | Simon et al. |
| 7,306,141 B1 | 12/2007 | Schwarz |
| 7,311,244 B1 | 12/2007 | Schwarz |
| 7,312,707 B1 | 12/2007 | Bishop et al. |
| 7,315,843 B2 | 1/2008 | Diveley et al. |
| 7,324,972 B1 | 1/2008 | Oliver |
| 7,328,350 B2 | 2/2008 | Hird |
| 7,330,836 B2 | 2/2008 | Kausik |
| 7,346,567 B2 | 3/2008 | Weeks |
| 7,349,866 B2 | 3/2008 | Schwarz |
| 7,353,383 B2 | 4/2008 | Skingle |
| 7,357,331 B2 | 4/2008 | Blossom |
| 7,363,262 B2 | 4/2008 | Reno |
| 7,363,492 B2 | 4/2008 | Kuhlman et al. |
| 7,363,494 B2 | 4/2008 | Brainard |
| 7,392,222 B1 | 6/2008 | Hamilton et al. |
| 7,392,224 B1 | 6/2008 | Bauer et al. |
| 7,398,248 B2 | 7/2008 | Phillips et al. |
| 7,401,731 B1 | 7/2008 | Pletz et al. |
| 7,418,728 B2 | 8/2008 | Jerdonek |
| 7,427,033 B1 | 9/2008 | Roskind |
| 7,444,672 B2 | 10/2008 | Ellmore |
| 7,448,538 B2 | 11/2008 | Fletcher |
| 7,454,794 B1 | 11/2008 | Hibbard |
| 7,461,028 B2 | 12/2008 | Wronski |
| 7,461,265 B2 | 12/2008 | Ellmore |
| 7,472,171 B2 | 12/2008 | Miller et al. |
| 7,480,631 B1 | 1/2009 | Merced |
| 7,493,288 B2 | 2/2009 | Biship et al. |
| 7,502,933 B2 | 3/2009 | Jakobsson |
| 7,506,806 B2 | 3/2009 | Bonalle et al. |
| 7,526,449 B1 | 4/2009 | Blossom |
| 7,591,416 B2 | 9/2009 | Blossom |
| 7,599,856 B2 | 10/2009 | Agrawal et al. |
| 7,606,771 B2 | 10/2009 | Keresman, III et al. |
| 7,707,089 B1 | 4/2010 | Barton |
| 7,711,122 B2 | 5/2010 | Allen et al. |
| 7,716,484 B1 | 5/2010 | Kaliski |
| 7,747,866 B1 | 6/2010 | Everhart |
| 7,889,753 B2 | 2/2011 | Ekbal et al. |
| 8,032,438 B1 | 10/2011 | Barton et al. |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0011250 A1 | 8/2001 | Paltenghe |
| 2001/0027389 A1 | 10/2001 | Beverina et al. |
| 2001/0027441 A1 | 10/2001 | Wankmueller |
| 2001/0032312 A1 | 10/2001 | Runje et al. |
| 2001/0034647 A1 | 10/2001 | Marks et al. |
| 2001/0034682 A1 | 10/2001 | Knight et al. |

(56) References Cited

U.S. PATENT DOCUMENTS

| | | |
|---|---|---|
| 2001/0034720 A1 | 10/2001 | Armes |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0051917 A1 | 12/2001 | Bissonette |
| 2001/0054003 A1 | 12/2001 | Chien et al. |
| 2001/0056398 A1 | 12/2001 | Scheirer |
| 2002/0019793 A1 | 2/2002 | Frattalone |
| 2002/0019803 A1 | 2/2002 | Muller |
| 2002/0023108 A1 | 2/2002 | Daswani |
| 2002/0026416 A1 | 2/2002 | Provinse |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046169 A1 | 4/2002 | Keresman, III et al. |
| 2002/0046255 A1 | 4/2002 | Moore et al. |
| 2002/0062235 A1 | 5/2002 | Wahlbin et al. |
| 2002/0062279 A1 | 5/2002 | Behrenbrinker et al. |
| 2002/0065712 A1 | 5/2002 | Kawan |
| 2002/0065720 A1 | 5/2002 | Carswell et al. |
| 2002/0069104 A1 | 6/2002 | Beach et al. |
| 2002/0073030 A1 | 6/2002 | Offer et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0091632 A1 | 7/2002 | Turock et al. |
| 2002/0091649 A1 | 7/2002 | Anvekar et al. |
| 2002/0095365 A1 | 7/2002 | Slavin et al. |
| 2002/0096570 A1* | 7/2002 | Wong et al. .................. 235/494 |
| 2002/0099586 A1 | 7/2002 | Bladen et al. |
| 2002/0099667 A1 | 7/2002 | Diamandis et al. |
| 2002/0104878 A1 | 8/2002 | Seifert et al. |
| 2002/0109435 A1 | 8/2002 | Cotton, III |
| 2002/0111886 A1 | 8/2002 | Chenevich et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0117541 A1 | 8/2002 | Biggar et al. |
| 2002/0120627 A1 | 8/2002 | Mankoff |
| 2002/0120642 A1 | 8/2002 | Fetherston |
| 2002/0120846 A1 | 8/2002 | Stewart et al. |
| 2002/0128973 A1 | 9/2002 | Kranzley |
| 2002/0129221 A1 | 9/2002 | Borgin et al. |
| 2002/0138418 A1 | 9/2002 | Zarin et al. |
| 2002/0139843 A1 | 10/2002 | Park et al. |
| 2002/0143703 A1 | 10/2002 | Razvan et al. |
| 2002/0145039 A1 | 10/2002 | Carroll |
| 2002/0147662 A1 | 10/2002 | Anderson |
| 2002/0147683 A1 | 10/2002 | Capobianco et al. |
| 2002/0147691 A1 | 10/2002 | Davis et al. |
| 2002/0152168 A1 | 10/2002 | Neofytides et al. |
| 2002/0156723 A1 | 10/2002 | Lilly et al. |
| 2002/0161702 A1 | 10/2002 | Milberger et al. |
| 2002/0165771 A1 | 11/2002 | Walker et al. |
| 2002/0165820 A1 | 11/2002 | Anvekar et al. |
| 2002/0169664 A1* | 11/2002 | Walker et al. .................. 705/14 |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178063 A1 | 11/2002 | Gravelle et al. |
| 2002/0190123 A1 | 12/2002 | Anvekar et al. |
| 2002/0194081 A1 | 12/2002 | Perkowski |
| 2002/0194124 A1 | 12/2002 | Hobbs et al. |
| 2002/0198848 A1* | 12/2002 | Michener .................. 705/75 |
| 2003/0004828 A1 | 1/2003 | Epstein |
| 2003/0010831 A1 | 1/2003 | Ye et al. |
| 2003/0018613 A1 | 1/2003 | Oytac |
| 2003/0023549 A1 | 1/2003 | Armes et al. |
| 2003/0028518 A1 | 2/2003 | Mankoff |
| 2003/0031321 A1 | 2/2003 | Mages et al. |
| 2003/0033211 A1 | 2/2003 | Haines et al. |
| 2003/0033246 A1 | 2/2003 | Slater |
| 2003/0033257 A1 | 2/2003 | Wankmueller |
| 2003/0034388 A1 | 2/2003 | Routhenstein et al. |
| 2003/0037262 A1 | 2/2003 | Hillhouse |
| 2003/0040927 A1 | 2/2003 | Sato et al. |
| 2003/0046249 A1 | 3/2003 | Wu |
| 2003/0053609 A1 | 3/2003 | Risafi et al. |
| 2003/0055780 A1 | 3/2003 | Hansen et al. |
| 2003/0055782 A1 | 3/2003 | Slater et al. |
| 2003/0061168 A1 | 3/2003 | Routhenstein |
| 2003/0065624 A1 | 4/2003 | James et al. |
| 2003/0074290 A1 | 4/2003 | Clore |
| 2003/0084002 A1 | 5/2003 | Ericson et al. |
| 2003/0085272 A1 | 5/2003 | Andrews et al. |
| 2003/0085286 A1 | 5/2003 | Kelley et al. |
| 2003/0101119 A1 | 5/2003 | Persons et al. |
| 2003/0101131 A1 | 5/2003 | Warren et al. |
| 2003/0105672 A1 | 6/2003 | Epstein et al. |
| 2003/0105714 A1 | 6/2003 | Alarcon-Luther et al. |
| 2003/0105981 A1 | 6/2003 | Miller et al. |
| 2003/0110111 A1 | 6/2003 | Nalebuff et al. |
| 2003/0115452 A1* | 6/2003 | Sandhu et al. .................. 713/155 |
| 2003/0121969 A1 | 7/2003 | Wankmueller |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0149660 A1 | 8/2003 | Canfield |
| 2003/0154125 A1 | 8/2003 | Mittal et al. |
| 2003/0154163 A1 | 8/2003 | Phillips et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0182246 A1 | 9/2003 | Johnson et al. |
| 2003/0187787 A1 | 10/2003 | Freund et al. |
| 2003/0195808 A1 | 10/2003 | Brown et al. |
| 2003/0195842 A1 | 10/2003 | Reece et al. |
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0204421 A1 | 10/2003 | Houle et al. |
| 2003/0205616 A1 | 11/2003 | Graves |
| 2003/0213843 A1 | 11/2003 | Jackson |
| 2003/0216965 A1 | 11/2003 | Libman |
| 2003/0217005 A1 | 11/2003 | Drummond et al. |
| 2003/0217329 A1 | 11/2003 | Good et al. |
| 2003/0218062 A1 | 11/2003 | Noriega et al. |
| 2003/0218066 A1 | 11/2003 | Fernandes et al. |
| 2003/0222136 A1 | 12/2003 | Bolle et al. |
| 2003/0225623 A1 | 12/2003 | Wankmueller |
| 2003/0229525 A1 | 12/2003 | Callahan et al. |
| 2003/0233327 A1 | 12/2003 | Keresman, III et al. |
| 2003/0236704 A1 | 12/2003 | Antonucci |
| 2004/0024672 A1 | 2/2004 | Brake, Jr. et al. |
| 2004/0024693 A1 | 2/2004 | Lawrence |
| 2004/0030626 A1 | 2/2004 | Libman |
| 2004/0039588 A1 | 2/2004 | Libman |
| 2004/0049455 A1 | 3/2004 | Mohsenzadeh |
| 2004/0059952 A1* | 3/2004 | Newport et al. .................. 713/202 |
| 2004/0064332 A1 | 4/2004 | Zou et al. |
| 2004/0064402 A1 | 4/2004 | Dreyer et al. |
| 2004/0088238 A1 | 5/2004 | Gilson et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0133787 A1 | 7/2004 | Doughty et al. |
| 2004/0153400 A1 | 8/2004 | Burke |
| 2004/0177045 A1 | 9/2004 | Brown |
| 2004/0193539 A1 | 9/2004 | Sullivan |
| 2004/0199474 A1 | 10/2004 | Ritter |
| 2004/0215507 A1 | 10/2004 | Levitt et al. |

(56) References Cited

U.S. PATENT DOCUMENTS

| | | |
|---|---|---|
| 2004/0225880 A1 | 11/2004 | Mizrah |
| 2004/0230843 A1 | 11/2004 | Jansen |
| 2004/0232223 A1 | 11/2004 | Beenau et al. |
| 2004/0236688 A1 | 11/2004 | Bozeman |
| 2004/0236819 A1* | 11/2004 | Anati et al. .......... 709/200 |
| 2004/0239481 A1 | 12/2004 | Beenau et al. |
| 2004/0242308 A1 | 12/2004 | Gray |
| 2004/0243498 A1 | 12/2004 | Duke |
| 2004/0252012 A1 | 12/2004 | Beenau et al. |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0071230 A1 | 3/2005 | Mankoff |
| 2005/0071637 A1 | 3/2005 | Shirakawa |
| 2005/0075932 A1 | 4/2005 | Mankoff |
| 2005/0077349 A1 | 4/2005 | Bonalle et al. |
| 2005/0077350 A1 | 4/2005 | Courtion et al. |
| 2005/0086160 A1 | 4/2005 | Wong |
| 2005/0091138 A1 | 4/2005 | Awatsu |
| 2005/0091492 A1 | 4/2005 | Benson et al. |
| 2005/0102228 A1 | 5/2005 | Srinivasan et al. |
| 2005/0108152 A1 | 5/2005 | Tsoa-Lee et al. |
| 2005/0114883 A1 | 5/2005 | Nagai et al. |
| 2005/0116024 A1 | 6/2005 | Beenau et al. |
| 2005/0119979 A1 | 6/2005 | Murshita et al. |
| 2005/0121512 A1 | 6/2005 | Wankmueller |
| 2005/0125295 A1 | 6/2005 | Tidwell et al. |
| 2005/0127164 A1 | 6/2005 | Wankmueller |
| 2005/0137977 A1 | 6/2005 | Wankmueller |
| 2005/0167488 A1 | 8/2005 | Higgins et al. |
| 2005/0171842 A1 | 8/2005 | Tien et al. |
| 2005/0171898 A1 | 8/2005 | Bishop et al. |
| 2005/0171905 A1 | 8/2005 | Wankmueller et al. |
| 2005/0179251 A1 | 8/2005 | Wagoner et al. |
| 2005/0189427 A1 | 9/2005 | Brown et al. |
| 2005/0193208 A1 | 9/2005 | Charrette, III et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2005/0289044 A1 | 12/2005 | Breslin et al. |
| 2005/0289052 A1 | 12/2005 | Wankmueller |
| 2006/0005039 A1 | 1/2006 | Hsieh |
| 2006/0020559 A1 | 1/2006 | Steinmetz |
| 2006/0026092 A1 | 2/2006 | Klein et al. |
| 2006/0031174 A1 | 2/2006 | Steinmetz |
| 2006/0036553 A1 | 2/2006 | Gupta et al. |
| 2006/0039733 A1 | 2/2006 | Meyerhofer |
| 2006/0047573 A1 | 3/2006 | Mitchell et al. |
| 2006/0047589 A1 | 3/2006 | Grau |
| 2006/0074794 A1 | 4/2006 | Nespola, Jr. |
| 2006/0081700 A1 | 4/2006 | Li |
| 2006/0085334 A1 | 4/2006 | Murphy |
| 2006/0106696 A1 | 5/2006 | Carlson |
| 2006/0116903 A1 | 6/2006 | Becerra |
| 2006/0116955 A1 | 6/2006 | Strayer et al. |
| 2006/0122918 A1 | 6/2006 | Graboske et al. |
| 2006/0131869 A1 | 6/2006 | Brignull |
| 2006/0157557 A1 | 7/2006 | Lee et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259766 A1 | 11/2006 | Rasti |
| 2006/0261927 A1 | 11/2006 | Kelly et al. |
| 2006/0269061 A1 | 11/2006 | Balasubramanian et al. |
| 2006/0282382 A1 | 12/2006 | Balasubramanian et al. |
| 2006/0289636 A1 | 12/2006 | Hoblit |
| 2007/0034700 A1 | 2/2007 | Poidomani et al. |
| 2007/0063025 A1 | 3/2007 | Blossom et al. |
| 2007/0067827 A1 | 3/2007 | Bhagavatula et al. |
| 2007/0118436 A1 | 5/2007 | McDowell |
| 2007/0118470 A1 | 5/2007 | Warren et al. |
| 2007/0136211 A1 | 6/2007 | Brown et al. |
| 2007/0180491 A1 | 8/2007 | Mevissen |
| 2007/0208671 A1 | 9/2007 | Brown et al. |
| 2007/0215688 A1 | 9/2007 | Routhenstein |
| 2007/0239622 A1 | 10/2007 | Routhenstein |
| 2007/0265924 A1 | 11/2007 | Schwarz, Jr. |
| 2007/0290034 A1 | 12/2007 | Routhenstein |
| 2008/0005018 A1 | 1/2008 | Powell |
| 2008/0027841 A1 | 1/2008 | Eder |
| 2008/0029607 A1 | 2/2008 | Mullen |
| 2008/0035738 A1 | 2/2008 | Mullen |
| 2008/0046263 A1 | 2/2008 | Sager |
| 2008/0054068 A1 | 3/2008 | Mullen |
| 2008/0054079 A1 | 3/2008 | Mullen |
| 2008/0054081 A1 | 3/2008 | Mullen |
| 2008/0065555 A1 | 3/2008 | Mullen |
| 2008/0154770 A1 | 6/2008 | Rutherford |
| 2008/0177659 A1 | 7/2008 | Lacey et al. |
| 2008/0230600 A1 | 9/2008 | Black et al. |
| 2008/0281722 A1 | 11/2008 | Balasubramanian et al. |
| 2008/0288396 A1 | 11/2008 | Siggers et al. |
| 2008/0302869 A1 | 12/2008 | Mullen |
| 2008/0302876 A1 | 12/2008 | Mullen |
| 2009/0048972 A1 | 2/2009 | Bierer et al. |
| 2009/0100508 A1 | 4/2009 | Labaton |
| 2009/0119205 A1 | 5/2009 | Keresman, III et al. |
| 2009/0185687 A1 | 7/2009 | Wankmueller |
| 2009/0265275 A1 | 10/2009 | Everhart et al. |
| 2009/0265460 A1 | 10/2009 | Balasubramanian et al. |
| 2009/0271853 A1 | 10/2009 | Everhart et al. |

FOREIGN PATENT DOCUMENTS

| | | |
|---|---|---|
| EP | 0 590 861 | 4/1996 |
| EP | 0843292 A2 | 5/1998 |
| EP | 0855659 | 7/1998 |
| EP | 0959440 | 11/1999 |
| EP | 0 884 877 | 12/1999 |
| GB | 2275654 A | 9/1994 |
| GB | 2376787 | 12/2002 |
| GB | 2377071 | 12/2002 |
| GB | 2377314 | 1/2003 |
| WO | WO 91/16691 | 10/1991 |
| WO | WO 96/08783 | 3/1993 |
| WO | WO 93/08545 | 4/1993 |
| WO | WO 94/29112 | 12/1994 |
| WO | WO 97/41673 | 11/1997 |
| WO | WO 98/37524 | 8/1998 |
| WO | WO 98/59307 | 12/1998 |
| WO | WO 99/05633 | 2/1999 |
| WO | WO 99/54841 | 10/1999 |
| WO | WO 00/62458 | 10/2000 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 01/88659 | 11/2001 |
| WO | WO 2005/043277 A3 | 5/2005 |
| WO | WO 2005/101975 | 11/2005 |
| WO | WO 2006/060370 | 6/2006 |
| WO | WO 2006/081525 | 8/2006 |
| WO | WO 2006/105092 | 10/2006 |
| WO | WO 2006/116772 | 11/2006 |
| WO | WO 2008/021382 | 2/2008 |

OTHER PUBLICATIONS

Song, A Card That Asks for ID, Time Magazine, Apr. 12, 2004, 1 page.

A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issues/issue7_3/claessens, retrieved from the internet on Oct. 6, 2006.

(56) References Cited

OTHER PUBLICATIONS

Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Block, Valerie, Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value Card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http: \ \www.ezpass.com-Disc_ny_annual.html, Nov. 12, 2001.
E-Z Pass, Web page, http: \ \ www.ezpass.com-frameMain.html, Nov. 12, 2001.
E-Z Pass, Web page, http: \ \www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Here's the calling convenience you asked for: 1-800-call-ATT . . . For All Calls, AT&T, Appendix A: for Card Carriers, 1999, 7 pages.
Hamey, Kenneth, Home Asset Management Accounts Link Mortgages Equity Lines.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, Vol.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.

(56) References Cited

OTHER PUBLICATIONS

O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251.
Meridian—the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Publishing, 1997.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1 (25), ISSN: 1069-7225, 17 pages.
Lazarony, Stuck for a gift? Give a prepaid credit card, www.bankrate.com, Dec. 21, 1998, 1 page.
Rossman, Kenneth, Summary Appraisal of Real Property.
Key, Swift Gift 'Wows' Internet Shoppers, PR Newswire, www.key.com/swiftgift/home.html, Dec. 2, 1998,1 page.
The Campus Card Conundrum, Card Technology, Journal ISSN: 1093-1279, p. 25+, Feb. 1998, pp. 1-8.
Electronic Purse Reaches the Car Park, http: \\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.

Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and Sermepa Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/avinews/PRaamisc042099.vhtml, San Francisco, Apr. 20, 1999.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Wells Fargo Blazes New Trail for Homeowners.
Kenneth Hein, What's the Deal?, Incentive, Jul. 1998, 7 pages.
"Caesar Cipher," Answers.com, http://www.answers.com/topic/caesar-cipher (9 pages).
"Daily Payment Card News," CardFlash at CardWeb.com, Oct. 13, 2005 (3 pages).
"Handy future for online security," BBC News, Oct. 17, 2002 (2 pages).
"Online Fraud," CardFlash, Apr. 26, 2005 (1 page).
"Paypal sells anti-fraud token," CardLine, Feb. 12, 2007 (1 page).
"Visa takes step with digital display card," CardLine, Dec. 5, 2006 (1 page).
"Web of Deceit," Analysis: Finextra Research, Mar. 11, 2005 (2 pages).
A Case Study of Authenticated and Secure File Transfer the Iowa Campaign Finance Reporting System (1997).
Abstract to 2007 JPMorgan Chase Disaster Response Card National Strategy Plan Abstract, Jan. 20, 2007.
American Express and Starwood Launch The New Starwood Preferred Guest SM Credit Card from American Express, Jun. 19, 2001.
Authorization of Financial Agent and Terms of Performance, Debit Card Application for Houston, Texas, Sep. 1991, acs00277412.
Coca-Cola ATM Money Cards, ACS 012, Apr. 8, 2009.
Crawford, J. "Paying with RFID, Smart Cards, and Biometrics," 2002 (4 pages).
Dam, K. et al. "Cryptography's Role in Securing the Information Society," Committee to Study National Cryptography Policy, National Research Council 1996 (24 pages).
Debit and Stored Value Cards for Government: A Growing Trend but States Could Do More, A Survey and White paper of The EBT Industry Council, Nov. 2006.
Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Digital Signatures—An Overview pp. 87-94 (1979).
Direct Payment Card, International EBT Pilot Evaluation Pilot Evaluation—Argentina, Jan. 1996, acs00277456.
Electronic Payment System, 1997, Artech House, XP002137255, p. 7-11.

(56) References Cited

OTHER PUBLICATIONS

Evers, J. "A password for your credit cards," CNET news, Aug. 2, 2006 (2 pages).
Frank, Beyond Direct Mail, Credit Card Management, vol. 9, Issue 5, Aug. 1996, 4 pages.
Gallant, The Hartford Offers Quick Claim Payment Solution for Customers in Katrina's Path, Sep. 15, 2005.
Gamble, R. "There's a New Wildcard for Payables," Treasury & Risk Management, Sep. 2006 (3 pages).
Graham-Rowe, D. "Security hole closes Microsoft Passport" Nov. 2001 (1 page).
Hansell, Visa to unveil electronic purse cards, New York Times, printed Feb. 23, 2001, 2 pages.
Image-based transaction processing the banking industry's challenge for the 1990s and beyond (1989) acs01039270.
Incentive Cards Explained, Incentive, Dec. 1995, 5 pages.
Information Processor Personal Computer PC has Message Display Unit Which Displays Message Stored in Help Table Corresponding to Indicated Button When Event Process Unit Detects that there is Indication to Button Selected to Override, Aug. 29, 1997.
Innovative Credit Card Fashions Take Hold Customized Plastic Good for Firms but Users Should Beware, Jun. 13, 1996.
Jazzy Jeff, Credit Card Commentaries cardoffers.com (2003).
Kennell, R., "Establishing the Genuinity of Remote Computer Systems," $12^{th}$ USENIX Security Symposium, Aug. 2003, pp. 295-310 (17 pages).
Kilian-Kehr, Mobile Security with Smartcards, Dissertation, Apr. 8, 2002.
Kingson, J., "Banks test ID device for online security," The New York Times, Dec. 23, 2004, (3 pages).
Kiwi Card Converts Unlikely to Lead Smart Revolution Little Support for Changes to Risk Allocation, Apr. 25, 2000.
Kmart Mastercard—cardweb.com (2000).
Lemos, R. "Two-factor authentication won't stop ID theft," silicon. com, Mar. 16, 2005 (2 pages).
Machlis, Have it the smart way: Burger King program drives smart-card use, Computerworld, printed Feb. 23, 2001, 1 page.
MailFrontier Survey Finds that Consumers Hold Financial Institutions Accountable for Online Identitiy Theft, www.mailfrontier.com, Palo Alto, CA, Nov. 2004.
McIellan, V. "Re: Token based OTP: SafeWord or SecurID?" Dec. 6, 2000 (6 pages).
Miller, Section E.2.1: Kerberos Authentication and Authorization System, Project Athena, Cambridge, MA, Dec. 21, 1987, 39 pages.
Nora Wood, Corporate Spotlight, Incentive, Dec. 1997, 4 pages.
Overview of Smart Cards and the Industry, Smart Cards Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Price, Joanne et al. U.S. Appl. No. 60/133,577, filed May 11, 1999.
Rankl, Smart Card Handbook, Second Edition (1999).
Schwartz, J., "Graduate Cryptographers Unlock Code of Thiefproof Car Key," The New York Times, Jan. 29, 2005, (3 pages).
Shankar, U., et al. "Side effects are not sufficient to authenticate software," $13^{th}$ USENIX Security Symposium, Aug. 2004, pp. 89-101 (13 pages).
Stiffened Card with Integrated Circuit, Aug. 1986.
The Power of the Card, Incentive, Jul. 1997, 6 pages.
Vincent Alonzo, Incentive Marketing . . . Three if by Smart Card, Incentive Sep. 1995, p. 11.
ViVOtech, Inc. RF-Based Contactless Payment a more convenient way to pay, Apr. 2004.
Wenninger et al., The Electronic Purse, Current Issues in Economics and Finance, vol. 1, No. 1, Apr. 1995, acs00098037.
Youll, Peer to Peer Transactions in Agent Mediated Electronic Commerce, Aug. 10, 2001.
Zdancewic, S. et al. "Secure Program Partitioning" Computer Science Department, Cornell University, Oct. 18, 2001 (35 pages).
Webster's Third International Dictionary, Unabridged, Merriam Webster, Inc., 1993. Retrieved Online Apr. 2009 at: http://lionreference.chadwyck.com/searchFulltext.do?id=17982789&idType=offset&divLevel=2&queryId=../session/1239138092_7973&area=mwd&forward=refshelf&trail=refsh.
Collins English Dictionary. London: Collins 2000, Credo Reference Online, Retrieved on Apr. 3, 2009 at: http://www.credoreference.com/entry/2668411.
Webster's Third International Dictionary, Unabridged, Merriam Webster, Inc., 1993. Retrieved Online Apr. 2009 at: http://lionreference.chadwyck.com/searchFulltext.do?id=35018654&idType=offset&divLevel=../session/1238803679_11620&area=mwd&forward=refshelf&trail=refsh.
Collins English Dictionary, London: Collins (2000) Credo Reference, Retrieved Online Apr. 2009 at: http://www.credoreference.com/entry/2668579.
Webster's Third International Dictionary, Unabridged, Merriam Webster, Inc., 1993. Retrieved Online Apr. 2009 at http://lionreference.chadwyck.com/searchFulltext.do?id=35018654&idType= offset&divLevel=2&queryId=../session/1238803679_11620&area=mwd&forward=refshelf&trail=refsh.
Collins English Dictionary, London: Collins (2000) Credo Reference, Retrieved Online Apr. 2009 at: http://www.credoreference.com/entry/2645829/.

\* cited by examiner

SYSTEMS AND METHODS FOR TIME VARIABLE FINANCIAL AUTHENTICATION

CROSS-REFERENCE TO RELATED APPLICATIONS

This application is a continuation of U.S. application Ser. No. 10/419,107 filed Apr. 21, 2003, which is a continuation-in-part application (CIP) of U.S. application Ser. No. 10/105,471 filed Mar. 25, 2002, both of which are hereby incorporated herein by reference in their entireties.

BACKGROUND OF THE INVENTION

The present invention relates to systems and methods to perform authentication of a transaction between a requesting entity, in particular a customer, and an authenticating authority.

Since the ancient invention of money, problems of counterfeiting have existed. These problems have led to ever more sophisticated measures to make the injection of false tokens, representing value, from successfully being used in a transaction. When in much more recent times credit cards were introduced, such measures were incorporated. For example, in earlier times, only a check digit formed by a secret algorithm was used to validate card numbers, the number space being very sparsely occupied so that the chance of finding a valid card number was relatively low. Then thieves learned how to forge this digit. As a result secret cryptography-based codes were added to the cards and checked by the card issuer when charges to an account were made. These measures have been useful in reducing fraud until recently.

However, with the practice of merchants storing card numbers, including some of the codes, insecurely on the Internet, there have been enough thefts of these numbers so that fraud is becoming an increasingly difficult problem. Such fraud often occurs in cases where the cards are not physically present. Fraud is reduced somewhat where the card is physically present. That is, credit cards contain fraud avoidance devices like holograms which make counterfeiting of physical cards more difficult than counterfeiting numbers off the cards.

Further, rules designed to prohibit storing the secret codes have been ignored, even by large issuers and as a result a new way to prevent fraudulent card use for remote customers is becoming necessary. Smart cards using public key encryption have been introduced, but these have met with little acceptance, due to their need for gadgetry to read them, which is not widely available.

Known techniques in the area of time based codes reach back to ancient times, when the password of the day was common in military camps. The notion of using widely synchronized times to control functions dates at least to the philosophy of Gottfried Liebniz (coinventor of the calculus and a contemporary of Isaac Newton). During World War II, codebooks valid for a particular day were used by both sides. The use of time stamps in computer communication is almost as old as computing. An example of their use in authentication can be found in the Kerberos system (MIT, 1987). Financial transactions have been timestamped to avoid replay problems also.

However, known techniques fail to provide an approach to effectively use the advance of time as an effective authentication mechanism. The present invention addresses the above, as well as other problems, that are present in known techniques.

BRIEF SUMMARY OF THE INVENTION

The systems and methods of the invention provide a technique for authenticating a finance related transaction. The method may include providing a token which contains a token counter, the token counter periodically advancing to generate a changing token value, the token counter being synchronized to a base counter that generates an authenticating value; transforming the token value into a token output sequence using logic; and outputting at least part of the token output sequence to an authenticating authority, the authenticating authority having access to the authenticating value. Further, the method includes the authenticating authority verifying the validity of the transaction based on the token output sequence and the authenticating value, from which the authenticating authority obtains a verification sequence using the logic, the verifying the validity including the authenticating authority comparing the token output sequence to the verification sequence to determine if there is a match between the token output sequence and the verification sequence.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Figure 1:
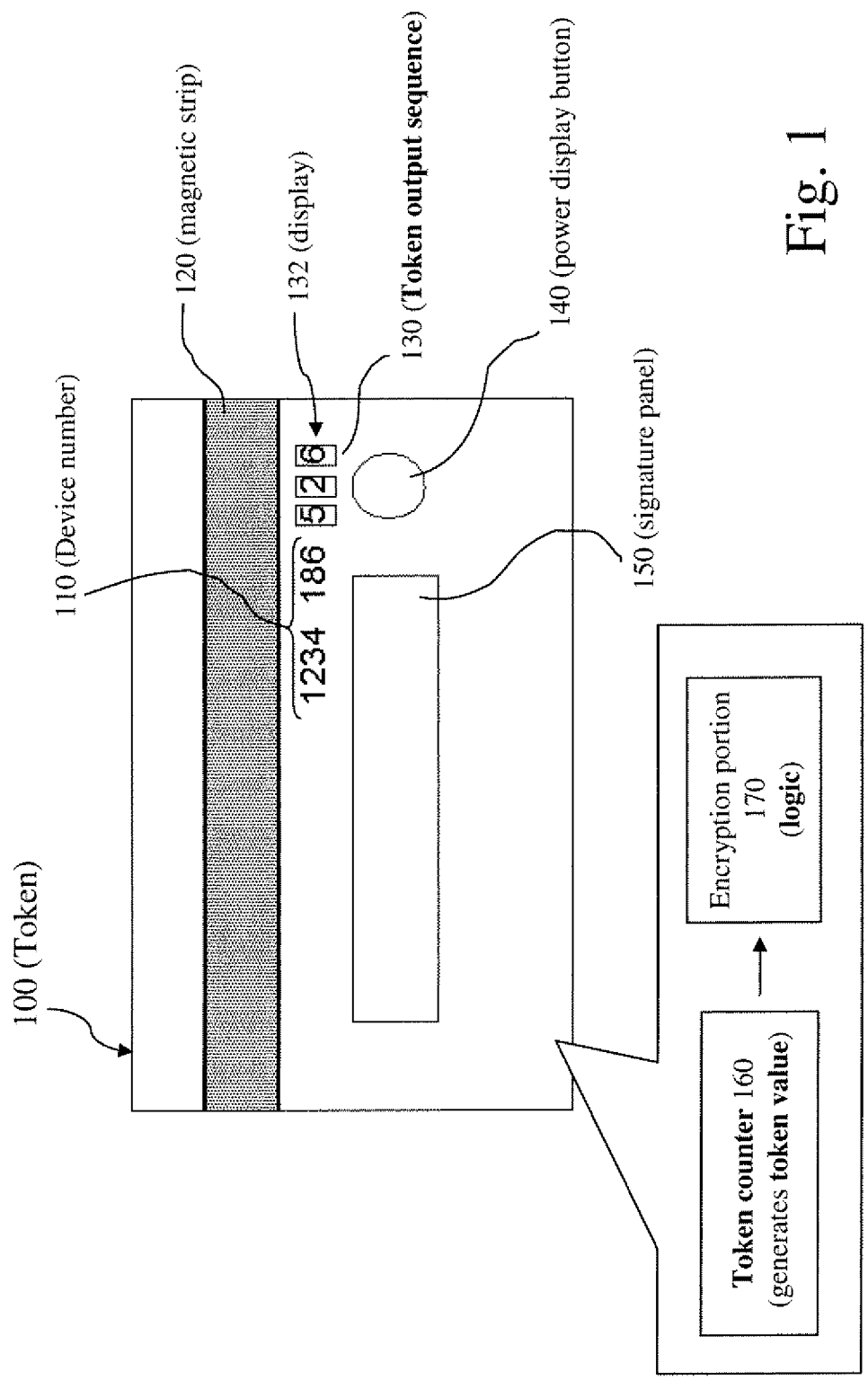
FIG. 1 is a diagram showing a token in accordance with one embodiment of the invention.

Hereinafter, features in accordance with various embodiments of the invention will be described. As used herein, any term in the singular may be interpreted to be in the plural, and alternatively, any term in the plural may be interpreted to be in the singular.

The present invention supplies a display on a consumer device, in accordance with one embodiment of the invention. The display displays an authentication code that varies with time. The "time" is synchronized to a known base time. An authenticating authority, such as the issuer for credit cards for example, can determine whether the correct code is being sent to it for a particular consumer device and for a particular transaction time. The time variability is obscured by a secret process on the consumer device to prevent those not in possession of the secret process from figuring out the code sequence. As a result, the authenticating authority can decide whether the requested transaction comes from a valid source. Because the display number is variable, it cannot be recorded on the Internet or elsewhere in a form useful for theft, save for very limited durations. Further such recorded numbers cannot be used to aid in impersonating a holder of a consumer device, e.g., a credit card, for purposes of identity theft. Widespread use of this invention will make telephone, network, or other remote commerce safer for all involved.

The token, in accordance with one embodiment of the invention, may be issued by an authenticating authority. An "authenticating authority" as used herein means either a central authority or a distributed authority, for example. The authenticating authority is capable of deciding whether to authorize transactions where a token is provided as a way to check the validity of authorizations, i.e., to permit them. The authenticating authority possesses authority to perform transactions in the scope of the invention including authority to effect a payment or authorize some other financial or financial-related transaction.

In accordance with one embodiment of the invention, the invention uses what might be characterized as a token. The token is used to indicate authority to perform transactions. The token includes a token clock or token counter that can maintain synchronization with a reference clock, i.e., a base counter, during the lifetime of the token. This synchronization might be maintained to within one or a few times the interval between changes of identifier. In accordance with one embodiment of the invention, this might include a counter which "ticks", i.e., changes value, one or a few times per day, for example.

Further, the token also includes a device or mechanism for performing a secret transform on the clock value. In accordance with one embodiment of the invention, this transformation might also involve some other separately observable attribute of the token, such as the credit card number or a cellular phone number. The token uses the secret transform, which is not available to the token holder, but that is reproducible by an authenticating authority. Further, the secret may be different for every such token so that if one is lost, only its secret is lost and other tokens remain secure. The result of this transform, or part of the result of the transform, is displayed by the token in such a way that the displayed number can be read by a person or device, i.e., whatever might read the token, and transmitted to an authenticating authority. Optionally, such an authority might demand that additional memorized digits or some other identifying indicia be supplied. This other indicia would further preclude use of a stolen token. That is, the token as described herein may be used with any other known authentication technique, as desired.

In accordance with one embodiment of the invention, the invention may be in the form so as to resemble a credit card. In addition to the existing credit card fields, i.e., such as magnetic stripe, for example, the card in accordance with one embodiment of the invention is provided with a small processor and battery. Further, the card includes a display that is visible on the card. The display shows a few digits computed by a secret process on the card. One such implementation might take a secret master key known to the issuer and encrypt the card account number and expiration with this master key. This diversified key then gets stored on the card. Further, it is noted that the diversified key may be different for each card.

As noted above, a clock computes a value that is transformed and then displayed on the token. That is, the token first reads the clock. The clock may be in the form of a counter of some type. For example, the clock for a certain batch of credit cards might advance based on the "hours since midnight on Jan. 1, 2001". Further, the credit cards might be synchronized when issued. In accordance with one embodiment of the invention, the initial value generated by the clock is encrypted with the diversified key.

Further, only the low three decimal digits of the result are displayed on the display, for example, in accordance with one embodiment of the invention. Of course, it is appreciated that any number of digits or selection of digits may be used, as is desired. Physically, the invention will not pose a problem since there currently exists flexible numeric displays much thinner than credit cards. Should power be limited to drive such a display all the time for a few years, a pushbutton or other switch might be present to conserve power.

When the credit card holder of the token of the invention makes a phone purchase or a net purchase, for example, he or she then reads the display, and possibly recites some other digits she is given to retain or memorize, in accordance with one embodiment of the invention. For example, such other digits might be the fixed CVV code (card validation value) on the back of the credit card. The credit card holder then furnishes such information to a merchant. The merchant then sends the information to the issuer, or some other authenticating authority, for validation.

The authenticating authority receives the card number, timestamp of the transaction, the token value and any added data. The authenticating authority then derives the diversified key from the card number and the master secret the particular card holds and/or reads such information from storage. Further, the authenticating authority checks the timestamp supplied for sanity, i.e., performs a crude reasonableness test, and uses the timestamp to derive the expected on-card clock value. The authenticating authority then encrypts this clock value with the diversified key and compares with the value supplied by the customer.

So as to avoid clock drift problems, the authenticating authority may compare adjacent timeslot values for the comparison operation. The authenticating authority then treats these adjacent timeslot values as matches if one of them produces the same code as was reported. The exact number of these comparisons depends on expected maximum clock drift on card over the card lifetime, i.e., two to three years, for example, and may be varied as desired. For example if it is expected the clock might drift under an hour, and the clock changes value at midnight, then transactions after 11 PM might be compared also with the next day's code, and similarly transactions before 1 AM might be compared with the prior day's code. In this way the card user never sees any effects of the clock changing during his transaction.

In accordance with further aspects of the invention, as noted above, a variety of other values may be supplied to a token holder for use in authenticating transactions. These other values can be recorded by the authenticating authority, or alternatively, can be computed by such an operation as encrypting the card number with a second secret key and using part of such resulting number. This additional number is entered when making a transaction, along with the displayed number, by the cardholder. Such added information makes a token less useful to someone who stole the token, as they would have to guess the correct check digits or digits to fool the authenticating authority.

Further, it may be desirable for the values, which the token displays, to be related mathematically to some separate observable about the token, e.g., such as a cellular phone number. For example, a second identifier built into the token may be used mathematically for computation of the value displayed by the display on the token. For tokens of the nature of credit cards, the preferred implementation encrypts the card number. For tokens like cell phones, there is a phone ID number which could be used. Such practice would make it harder to forge tokens and will be found to be of particular use for tokens in which the internal state cannot be hidden well from users, i.e., the internal state meaning a cell phone number, for example. In those cases where the internal state cannot be hidden, it may be desired to use other identifiers, in addition to the token value described herein, in order to gain the added protection against fraud.

As described herein, one embodiment of the invention uses a token resembling a credit card. However, any of a wide variety of tokens may be used. Accordingly, as used herein a "token" means a device which is presented or which bears information which is presented by someone to set up a payment or similarly authorize some financial or financial-related transaction. Accordingly, a token of the invention may be in a wide variety of forms including a token in the form of a credit card, or a gasoline-buying "speedpass," for example. Accordingly, the token in the invention may be in the form of credit card or debit card type device possessing a display to be read by the cardholder, a credit card type device having a magnetic strip, a radio frequency generating device, an infrared signal generating device, an audio signal generating device, a magnetic pattern generating device, and/or other devices for outputting a data signal, i.e., such as a PDA (personal digital assistance) outputting a data signal to a computer or to a cashier, for example.

Further, as described herein, the token of the invention generates a "display." As used herein, a "display" means whatever sends information off the token for authentication checks. For credit card type tokens, the display might be some visible display. For other types of tokens, the display might be a radio or audio signal, or magnetic patterns, for example. Accordingly, a "display" in a token of the invention may illustratively be an LED (light emitting diode), an LCD (liquid crystal display), a magnetic strip, a radio frequency signal, an infrared signal, an audio signal, a magnetic pattern, any other data signal, or any other technique that may be used to convey information from the token to the merchant, and in turn to the authenticating authority, for example. As is appreciated, interim steps may be needed such as a human cardholder reading the token output sequence and inputting the token output sequence into a computer via a keyboard or to a human merchant verbally, for example.

As described in various examples herein, the token of the invention may be used in an interaction between a customer and a merchant. However, the token of the invention may be used in a variety of other situations between any of a wide variety of entities. For example, the treasurer of a corporation might use the token described herein to validate instructions to a bank, i.e., regarding a desired transaction, for example. Accordingly, the token of the invention might be used in conjunction with transactions between two banks or between any other institutions or entities, for example.

The checking is preferably done off the token, although a central authority's processing might be replaced in some cases by some combination of other processing with perhaps other tokens whose trust is established in other ways, e.g., such as biometrics, for example, to allow local checking of such tokens for authenticity. That is, the token of the invention may well be used in conjunction with other authentication checks, such as simply a credit card number, for example; and the authenticating authority may be made up of separate portions so as to collectively perform the verification process.

Hereinafter, further aspects of the systems and methods of the invention will be described with reference to the drawings. FIG. 1 is a diagram showing a token 100 in accordance with one embodiment of the invention. As shown in FIG. 1, the token 100 includes a device number 110. While the token 100 is shown in FIG. 1 as being similar to a credit card, it is appreciated that the token 100 may be in any of a wide variety of shapes and sizes.

As shown in FIG. 1, the token 100 also includes a magnetic strip 120. Further, the token 100 includes a token output sequence 130, i.e., a number, that is presented by a display 132. The token output sequence 130 is generated by the token 100 based on the progression of a clock, as described above, for example. In order to conserve energy of the token 100, the token output sequence 130 might not be displayed at all times. That is, the holder of the token 100, in accordance with one embodiment of the invention, presses the power display button 140 to display the token output sequence 130. Such action results in a token output sequence being displayed and visible to the holder. As shown in FIG. 1, the token 100 may also include a signature panel 150 to provide further verification of the veracity of the holder.

To explain further, the token output sequence 130 is generated using a token counter 160. The token counter 160 generates a token value. This token value is output within a token 100 to an encryption portion 170. The encryption portion 170 provides logic to process the token value to result in the token output sequence 130. Both the progression of the token counter 160 as well as the logic used in the encryption portion 170 is known and simulated by a verification or authenticating authority so as to verify a transaction by the holder of the token 100.

The embodiment of FIG. 1 utilizes a display 132 to display the token output sequence 130. However, is appreciated that the token output sequence 130 may be displayed using a variety of techniques, as is further described below. For example, the token output sequence 130 might be input into the magnetic strip 120, i.e., so as to be output to a merchant, for example.

Figure 2:
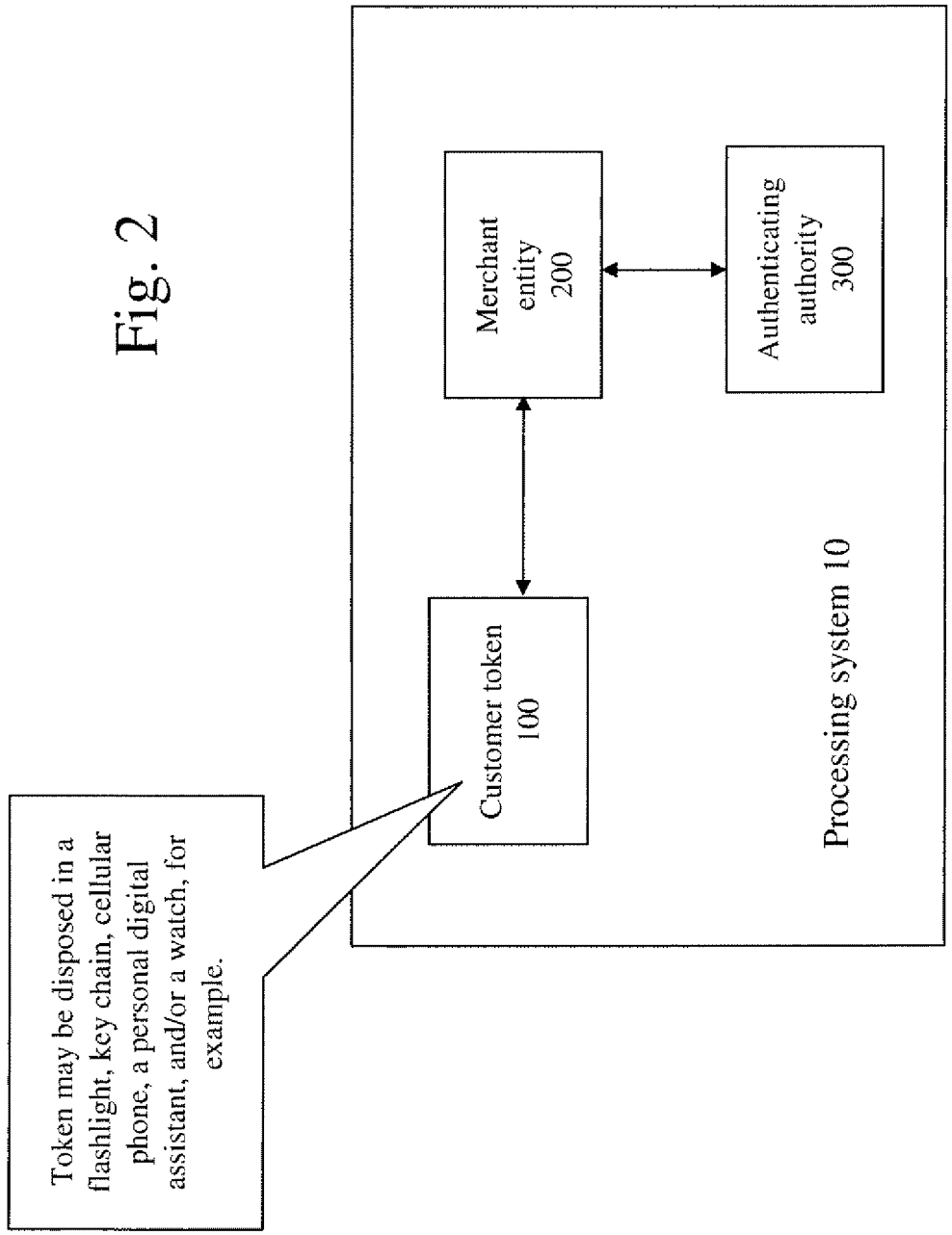
FIG. 2 is a block diagram showing a processing system in accordance with one embodiment of the invention.

FIG. 2 is a block diagram showing a processing system 10 in accordance with one embodiment of the invention. As shown in FIG. 2, the processing system 10 includes a customer token 100. Further, the processing system 10 includes a merchant entity 200 and an authenticating authority 300.

In accordance with one embodiment of the invention, the customer token 100 takes the form of the device shown in FIG. 1. Further, the merchant entity 200 may be in any of a wide variety of forms such as merchant disposed in a physical merchant store, an internet entity, a receiver such as on a toll road device, a telephone entity, as well as a wide variety of other arrangements, as should be appreciated. Further, as shown in FIG. 2, the token 100 may be disposed in a variety of devices, such as in a flashlight, key chain, cellular phone, a personal digital assistant, and/or a watch, for example.

Figure 3:
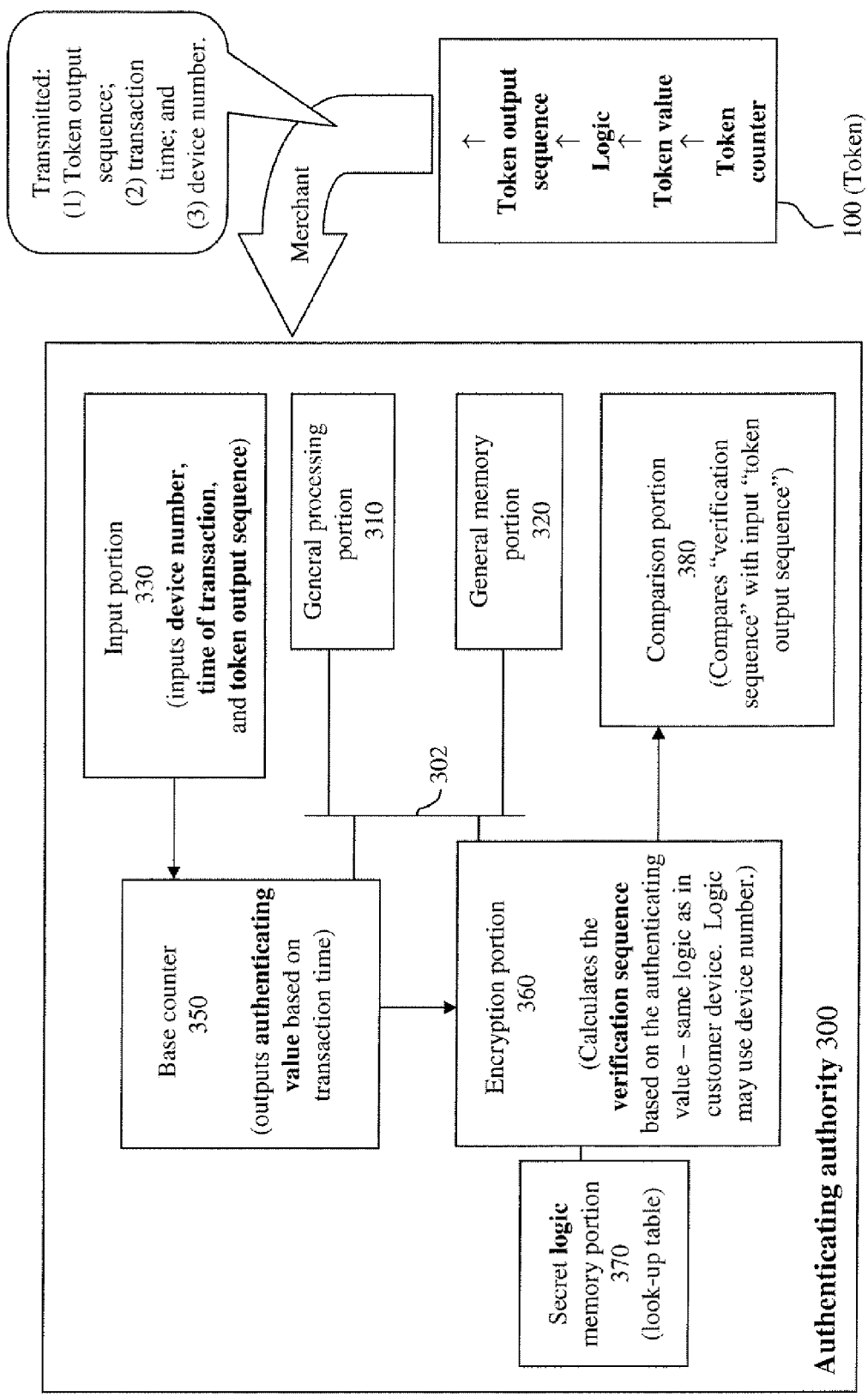
FIG. 3 is a block diagram showing an authenticating authority in accordance with one embodiment of the invention.

FIG. 3 is a block diagram showing in further detail the authenticating authority 300. The authenticating authority 300 includes a general processing portion 310 and a general memory portion 320. The general processing portion 310 controls overall operations of the various components disposed in the authenticating authority 300. Further, the general memory portion 320 provides a wide variety of memory resources to the authenticating authority 300.

The authenticating authority 300 further includes an input portion 330. The input portion 330 inputs information necessary to verify a transaction performed using the token 100. Illustratively, the input portion 330 inputs a device number from a token, the time the transaction, as well as a token output sequence. The authenticating authority 300 further includes a base counter 350. The base counter 350 outputs an authenticating value based on the transaction time, which is received from the token 100. This authenticating value is created using processing performed in parallel to the token counter 160. Specifically, the base counter 350 simulates the output that the token counter 160 would have generated at the time of the transaction.

Further, the authenticating authority 300 includes an encryption portion 360. The encryption portion 360 calculates a verification sequence in the same secret logic as in the token 100. In the authenticating authority 300, the encryption portion 360 operates in conjunction with the secret logic memory portion 370 to generate the verification sequence. For example, the secret logic memory portion might use the device number to determine which logic to apply to the verification sequence, e.g., using a look-up table, for example.

In accordance with one embodiment of the invention, it is noted that the logic might use the device number in mathematical processing of the authenticating value, or, in the token, the logic might use the device number in mathematical processing of the token value.

Further, the authenticating authority 300 includes a comparison portion 380. The comparison portion 380 uses the verification sequence, which is generated within the authenticating authority 300, and compares such verification sequence with the input "token output sequence," which is input from the token 100.

Figure 4:
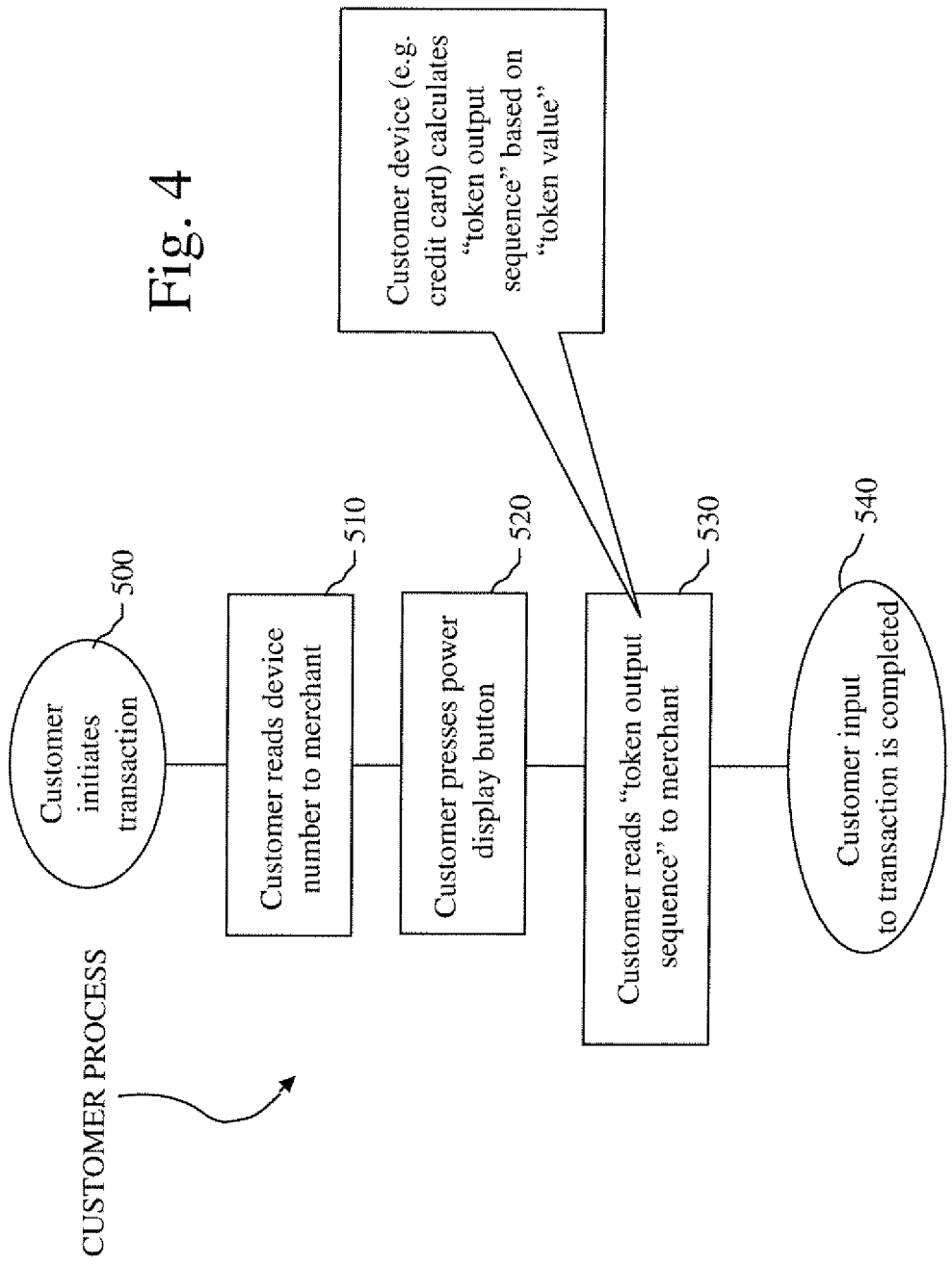
FIG. 4 is a flowchart showing a "customer initiates transaction" process in accordance with one embodiment of the invention.

FIG. 4 is a flow chart showing a customer process in accordance with one embodiment of the invention. As shown in FIG. 4, the process starts in step 500 in which the customer initiates a transaction. After step 500, the process passes to step 510. In step 510, the customer reads, or in some other manner conveys, the device number to the merchant. Then, in step 520, with reference to the embodiment of the invention shown in FIG. 1, the customer presses the power display button. As a result, the token output sequence is displayed for viewing by the customer. Accordingly, in step 530, the customer reads the token output sequence to the merchant. In conjunction with step 530, the customer device, i.e., the token 100, for example, calculates the token output sequence based on a token value generated in the token, i.e., based on the progression of the clock in the token. After step 530 of FIG. 4, the process passes to step 540. In step 540, the customer input to the transaction is completed.

Figure 5:
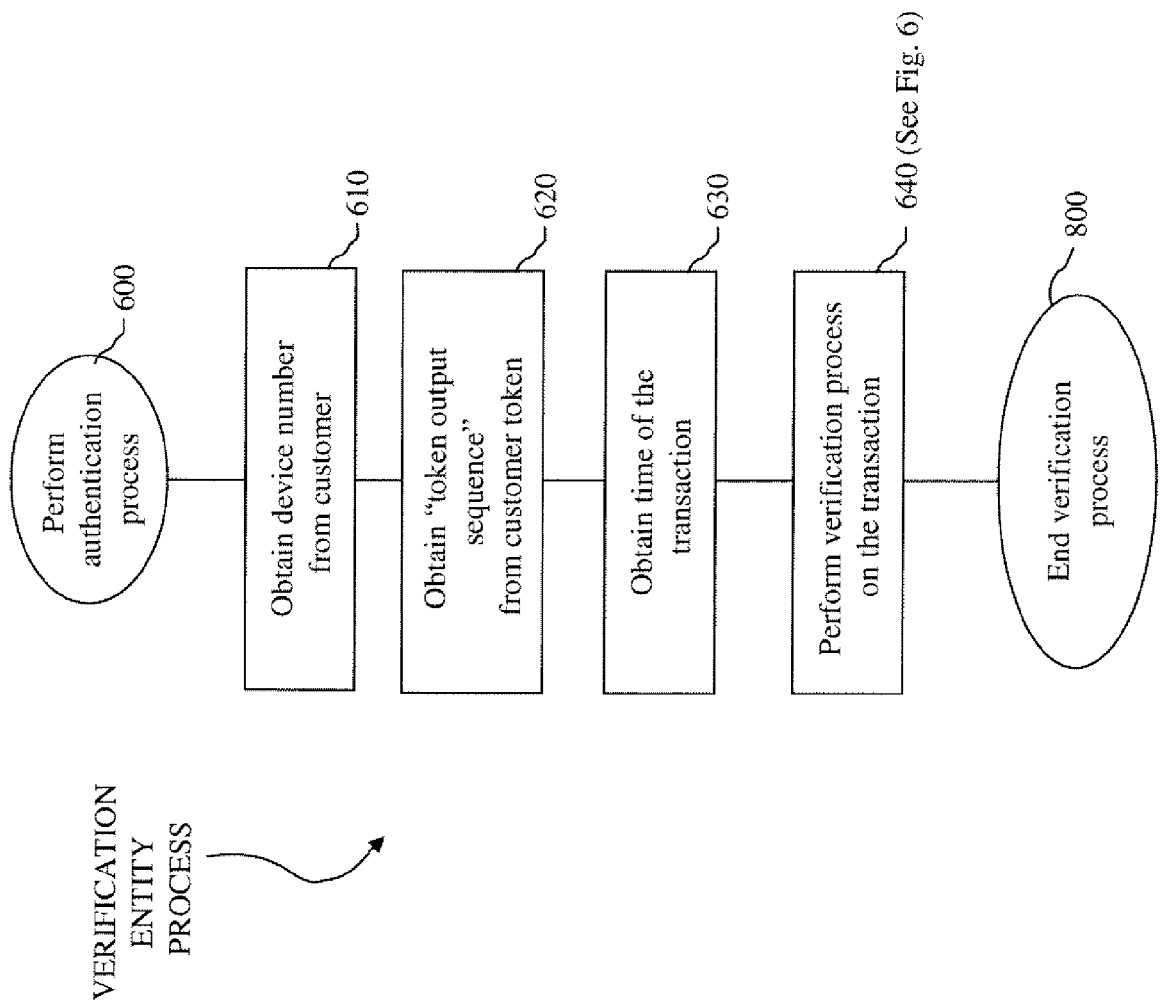
FIG. 5 is a flowchart showing the "perform authentication process" in accordance with one embodiment of the invention.

FIG. 5 is a flow chart showing an authenticating authority process in accordance with one embodiment of the invention. As shown in FIG. 5, the process starts in step 600 and passes to step 610. In step 610, the authenticating authority obtains the device number from the customer. Then, in step 620, the authenticating authority obtains the token output sequence number from the customer. After 620, the process passes to step 630. In step 630, the authenticating authority also inputs the time of the transaction, i.e., which may be obtained from the merchant in accordance with one embodiment of the invention. Accordingly, each of the items of information input in steps 610, 620 and 630 are obtained from the customer and/or the merchant and may typically be transmitted from the customer through the merchant so as to be input by the authenticating authority.

Figure 6:
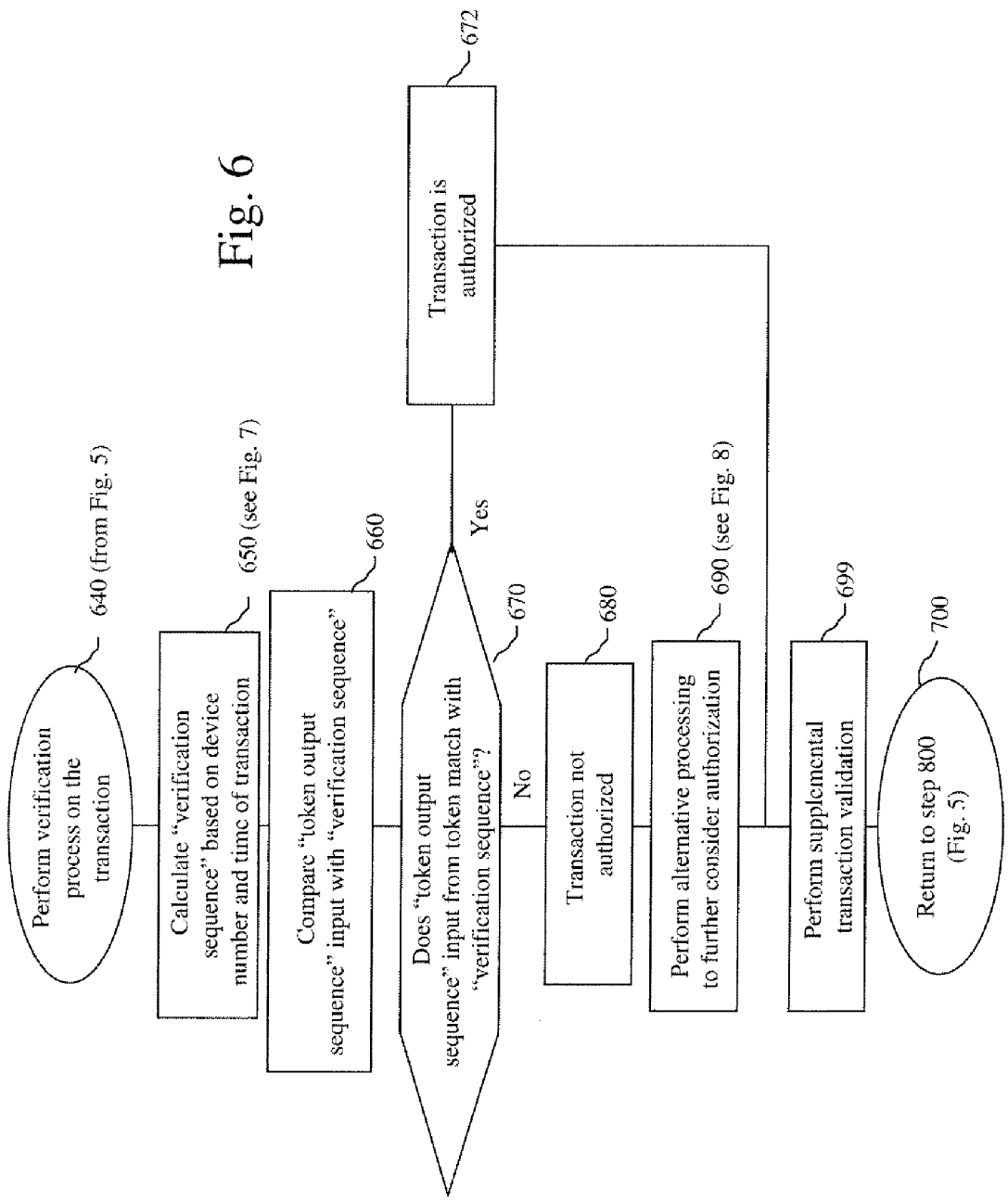
FIG. 6 is a flowchart showing the "perform verification process on the transaction" step of FIG. 5 in accordance with one embodiment of the invention.

Returning to FIG. 5, after step 630, the process passes to step 640. In step 640, the authenticating authority performs a verification process on the transaction. FIG. 6 is a flowchart showing in further detail step 640. After step 640 of FIG. 5, the process passes to step 800. In step 800, the verification process is completed.

As noted above, FIG. 6 is a flowchart showing in further detail the "perform verification process on the transaction." As shown in FIG. 6, the process starts in step 640 and passes to step 650. In step 650, the process, i.e., performed by the authenticating authority, calculates a "verification sequence" based on the device number and the time of transaction, which has been input. Then, in step 660, the authenticating authority compares the "token output sequence" input from the customer with the "verification sequence". After step 650, the process passes to step 670.

In step 670, as shown in FIG. 6, the process determines whether the token output sequence that is input from the customer matches with the verification sequence that is generated within the authenticating authority. If yes, i.e., there is a match, then the process passes to step 672. In step 672, the transaction is authorized. After step 672, the process passes to step 699.

Figure 8:
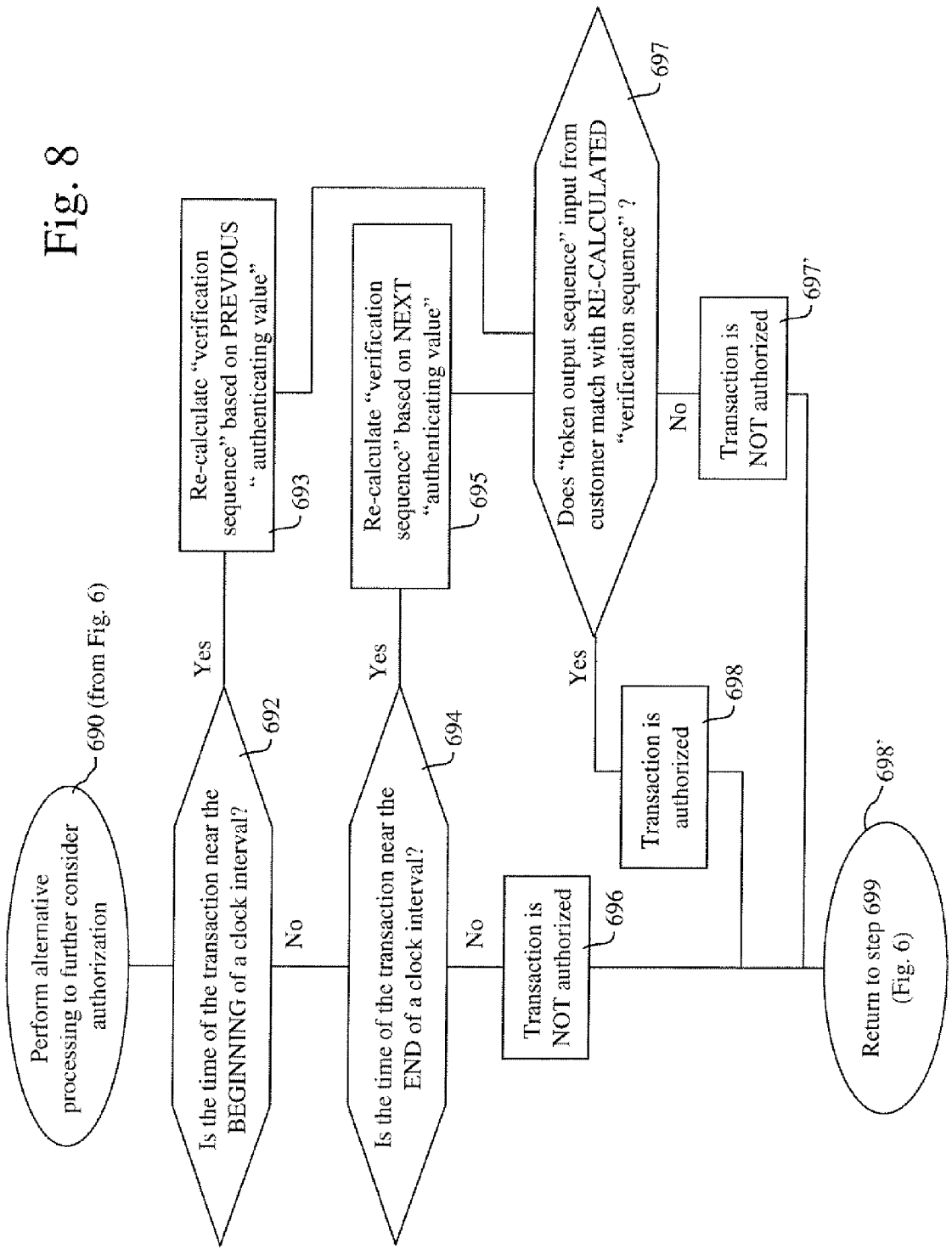
FIG. 8 is a flowchart showing the "perform alternative processing to further process authorization" step of FIG. 6 in accordance with one embodiment of the invention.

Alternatively, it may be the situation that in step 670, the token output sequence does not match with the verification sequence. As a result, the processes passes from step 670 to step 680. In step 680, an initial determination is made that the transaction is not authorized. However, this is merely an initial determination. That is, after step 680, the process passes to step 690. In step 690, the process performs alternative processing to further consider the authorization. That is, the process performs further processing to ascertain whether the transaction was indeed a valid transaction. FIG. 8 is a flowchart showing in further detail step 690. After 690 of FIG. 6, the process passes to step 699.

In step 699, the process may perform a supplemental transaction validation, as is necessary or desired. That is, it is appreciated that there may be other criteria that makes an authenticator decide to allow the transaction or not. For example suppose a transaction is coming supposedly from Seattle and the authenticating authority experienced a transaction, with the same token, from New York 10 minutes ago. The authenticating authority might want to decline this transaction even if the authorization number appeared to be correct. Likewise even if the transaction is not authorized, maybe the issuer will determine the electronics have glitched and he may use other information, ask the merchant for other information, or just warn the merchant and let the merchant decide whether to go ahead anyway, i.e., since the merchant will bear any loss. After step 699, the process passes to step 700. In step 700, the process returns to step 800 of FIG. 5.

Figure 7:
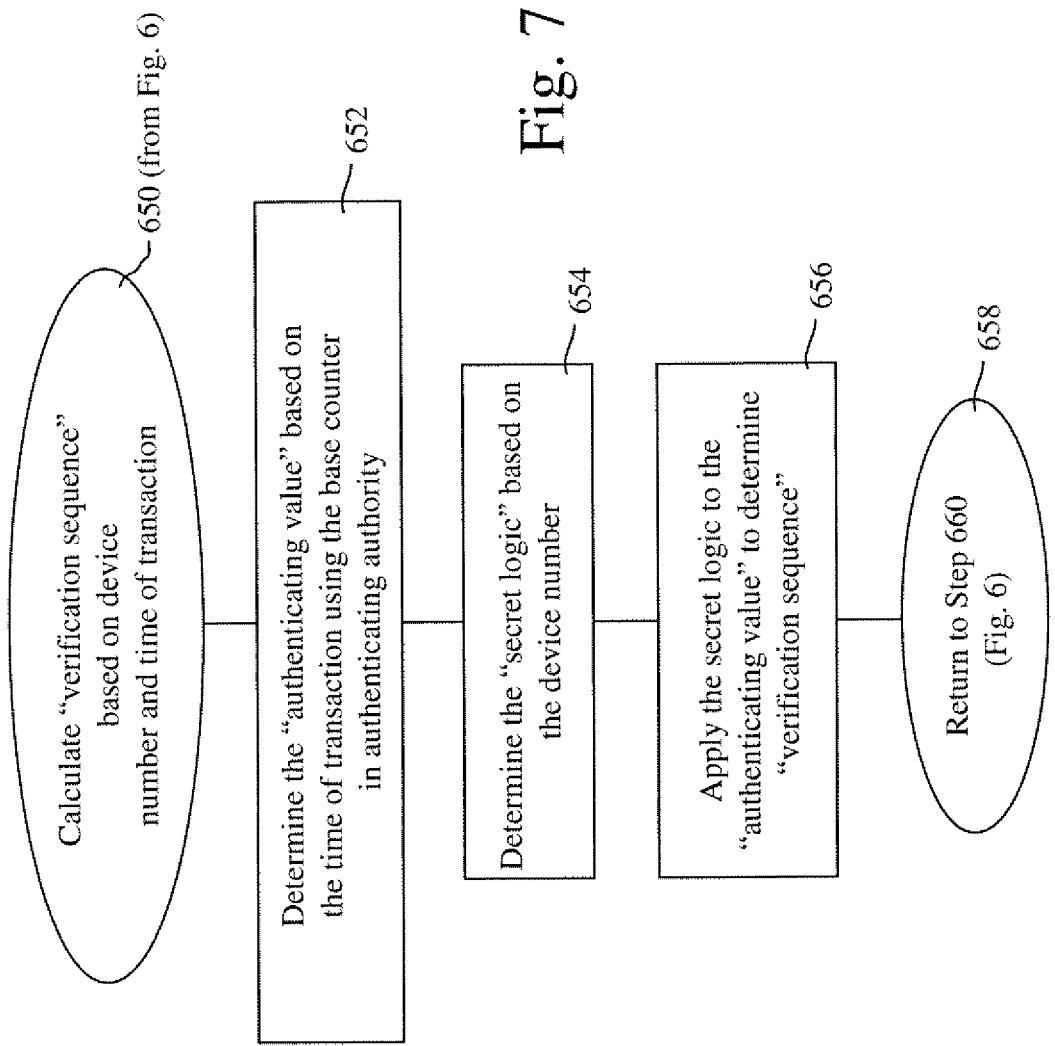
FIG. 7 is a flowchart showing the "calculate 'verification sequence' based on device number and time of transaction" process of FIG. 6 in accordance with one embodiment of the invention.

FIG. 7 is a flowchart showing in further detail step 650 of FIG. 6 "calculate verification sequence based on device number and time of transaction." After the sub-process of FIG. 7 starts, the process passes from step 650 to step 652. In step 652, the process determines the "authenticating value" based on the time of transaction. Then, in step 654, the process determines the "secret logic" based on the device number. That is, it is appreciated that different logics may be used for different devices. The device number, or some other identifying indicia that may be associated with a particular device, may be used to determine which logic should be applied by the authenticating authority. After step 654, the process passes to step 656. In step 656, the process proceeds with applying the secret logic to the "authenticating value" to determine, in turn, the "verification sequence". After step 656, the process passes to step 658. In step 658, the process returns to step 660 of FIG. 6.

FIG. 8 is a flowchart showing in further detail the "perform alternative processing to further process authorization" step 690 of FIG. 6. In particular, the process of FIG. 8 relates to the situation where clock drift has occurred between the clock in the authenticating authority as compared with the clock in the token 100. Such drift between the clocks may result in an initial finding that a transaction is not valid. However, the process of FIG. 8 addresses a potential incorrect finding of an invalid transaction.

To explain, the process of FIG. 8 starts in step 690 and passes to step 692. In step 692, the process determines whether the time of transaction is near the beginning of a clock interval, i.e., is the time of the transaction near the time that the clock in the authenticating authority experienced a change. If yes in step 692, then the process passes to step 693. In step 693, the process recalculates the verification sequence based on the previous base counter setting. After step 693, the process passes to step 697.

Alternatively, in step 692, the process may have determined that the time of the transaction is not at the beginning of a clock interval. As a result, the process passes to step 694. In step 694, the process, as illustratively performed by the authenticating authority, determines whether the time of the transaction is near the end of a clock interval. If yes, then the process passes from step 694 to step 695. In step 695, the process recalculates the "verification sequence" based on the next base counter setting. Then, the process passes to step 697.

In step 697, the process determines whether the token output sequence input by the customer matches with the recalculated verification sequence. That is, step 697 checks whether the previous or the next clock setting of step 693 and step 695, respectively, result in a match between the token output sequence and the verification sequence. If yes, then the process passes to step 698. That is, if there is indeed a match then the transaction is authorized. After step 698, the process passes to step 698'. Alternatively, in step 697, there may still not be a match between the token output sequence input by the customer and the recalculated verification sequence. As a result, the process passes to step 697' and the transaction is not authorized. After step 697', the process passes to step 698'.

As noted above, in step 694 of FIG. 8, the process determines whether the time of the transaction is near the end of a clock interval. Further, step 692 determined if the transaction is near the beginning of a clock interval. If neither of the situations is present, then the process passes to step 696. In step 696, the process determines that the transaction is indeed not authorized. As a result, the process passes to step 698'. However, it is appreciated that more then the immediately adjacent intervals may be considered. For example if the clock advances relatively quickly, this results in a potential for substantial clock drift. As a result, it may be desired to check three, for example, (or as many as desired) intervals before the initially considered interval, as well as three subsequent intervals, for example.

In step 698', the process returns to step 699 and then to step 700 of FIG. 6. As noted above, in step 700 of FIG. 6, the process returns to step 800 of FIG. 5 in which the verification process is terminated.

Figure 9:
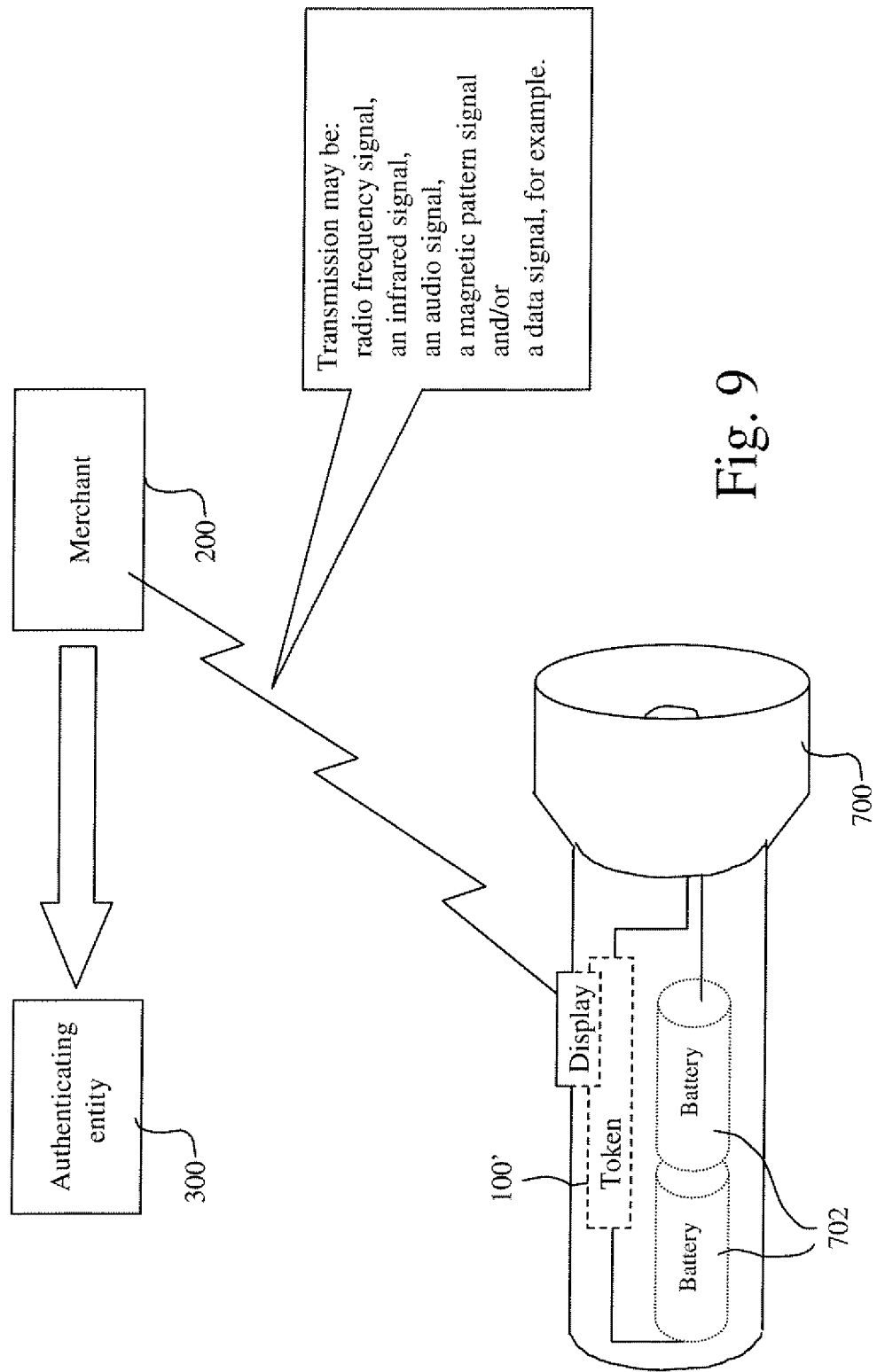
FIG. 9 is a diagram showing a token in a flashlight in accordance with one embodiment of the invention.

In accordance with a further embodiment of the invention, FIG. 9 is a diagram showing a token 100' disposed in a flashlight 700. The token 100' may operate in a similar manner to the token 100, as shown in FIG. 1. The flashlight 700 may include batteries 702. In accordance with one embodiment of the invention, the batteries 702 may power operations of the token 100'. As described above, the token 100' generates a token output sequence, and transmits the token output sequence to a merchant 200. This transmission may be in a variety of forms, as is shown in FIG. 9. In turn, the merchant 200 outputs the token output sequence, as well as a time stamp and a token device number, which is also obtained from the token, to the authenticating entity 300.

Figure 10:
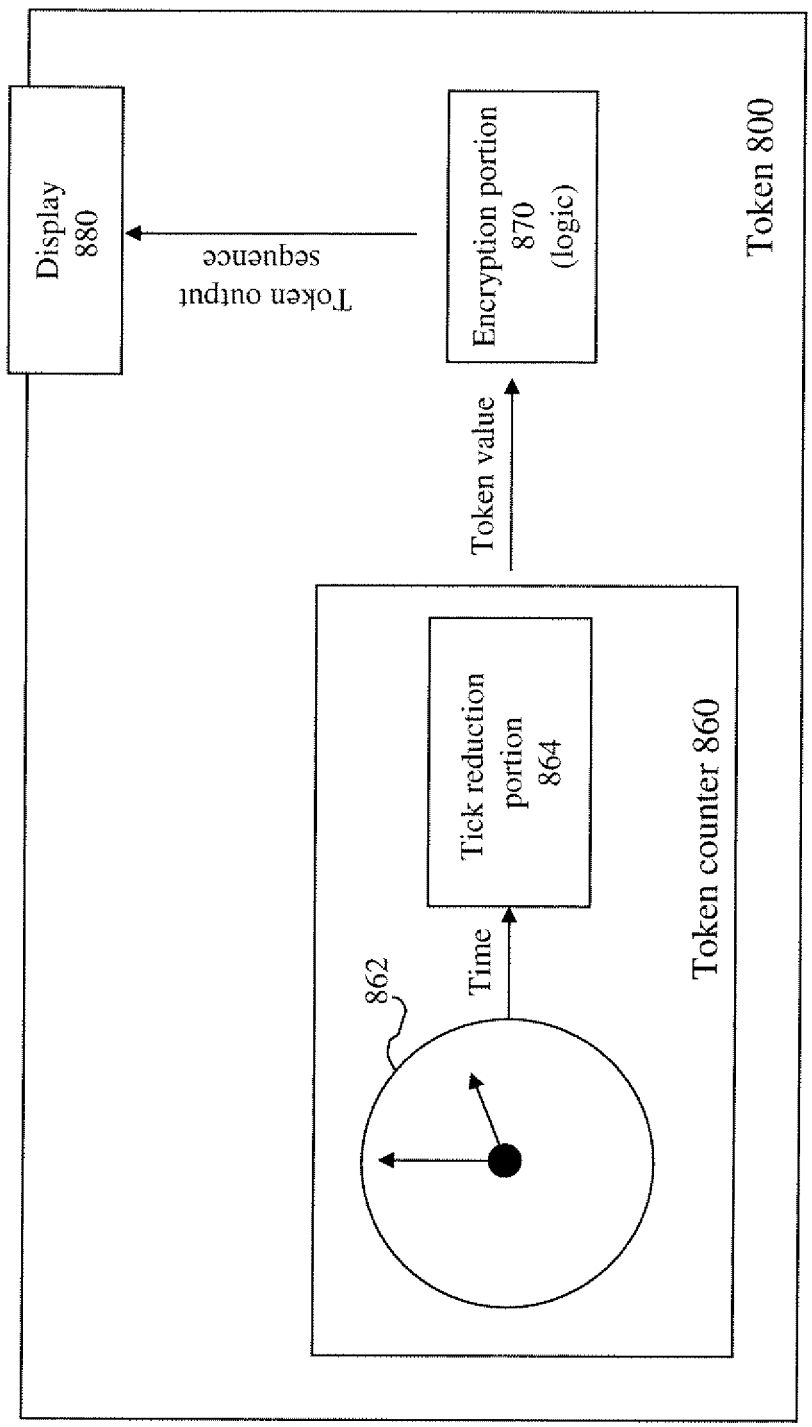
FIG. 10 is a block diagram showing a token using a twenty-four hour clock in accordance with one embodiment of the invention.

In accordance with a yet further embodiment of the invention, FIG. 10 is a block diagram showing a token 800 that may operate in a similar manner to the token 100. The token 800 includes an encryption portion 870 and a display 880. The encryption portion 870 provides the logic to convert the token value into the token output sequence, as described above. This logic may take on a variety of forms so as to manipulate the token value, as is desired, i.e., such as a mathematical manipulation of the token value, for example. The token counter of the embodiment of FIG. 10 includes a clock 862 and a tick reduction portion 864. The clock may be a standard twenty-four hour clock, but may preferably be a digital clock, i.e., such that a digital output may be output to the tick reduction portion 864.

The tick reduction portion 864 works off the advancement of the clock 862 to generate the token values. However, the tick reduction portion 864 advances at a much slower rate. For example, for every 12 hours that the clock 862 advances, the tick reduction portion 864 may only advance once. As is noted above, such reduced advancement reduces the effects of clock drift between the token and the authenticating authority.

In accordance with further aspects of the invention, it is appreciated that the token value, the token output sequence, the authenticating value, and the verification sequence, for example, may be numbers, letters, symbols, punctuation and/or any other character set, for example. However, the particular composition of the token value, as well as the corresponding authenticating value, should be such that such values may advance in a routine manner.

As described above, the systems and methods of the invention rely upon time stamping in accordance with embodiments of the invention. Accordingly, a variety of techniques may be used to address different time zones. For example, one time zone may be designated as a standard and all time stamps converted to this standard.

As described above, methods and systems are disclosed which permit tokens used for finance to be checked for authenticity by having the tokens display an authentication code that varies with time, yet can be validated by the token validation authority. Because the authentication code changes, such codes may not readily be stored and stolen, as is a problem in existing codes. The invention reduces fraud for all involved where there is risk that a token might be a forgery.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A system comprising:
    a credit card comprising a computer processor and having an account identifier and a display for displaying a number that changes based on a clock for use in a transaction, the computer processor generating the number by transforming a value associated with the clock using a key; and
    a device that receives only the account identifier and the number and transmits the account identifier, the number, and a timestamp of a transaction to an authenticating authority for authenticating the transaction;
    wherein the account identifier and the number are received as separate numbers, and
    wherein the number comprises at least one digit that does not change.

2. The system of claim 1, further comprising:
    a token counter, the token counter periodically advancing to generate a changing token value, the token counter being synchronized to a base counter that generates an authenticating value, wherein the number is based at least in part on the token value.

3. The system of claim 1, further comprising communicating the account identifier and the number wirelessly to the device.

4. The system of claim 1, further comprising communicating the account identifier and the number to the device via a magnetic stripe of the credit card.

5. The system of claim 1, wherein the credit card comprises a battery.

6. The system of claim 1, wherein the number comprises at least a portion of a credit card number.

7. The system of claim 1, wherein the number comprises an authentication code.

8. The system of claim 1, wherein the clock is synchronized with a clock of the authenticating authority.

9. The system of claim 1, wherein the credit card further comprises a manual switch.

10. The system of claim 1, wherein the device reads the account identifier and the number from a magnetic strip on the credit card.

11. The system of claim 1, wherein the account identifier and the number are unrelated.

12. The system of claim 1, wherein the account identifier and the number are separately received in the same communication.

13. The system of claim 1, wherein the device is provided by a party to the transaction.

14. The system of claim 1, wherein the authenticating authority derives an expected on-card clock value from the timestamp.

15. A method comprising:
    displaying, on a display of a payment card having an account identifier, a number for use in a transaction, the number generated by a computer processor by transforming a value associated with a clock using a key of the payment card; and
    receiving, at a device, only the account identifier and the number from the payment card and transmitting the account identifier, the number, and a timestamp of a transaction to an authenticating authority for authenticating the transaction;
    wherein the account identifier and the number are received as separate numbers, and
    wherein the number comprises at least one digit that does not change.

16. The method of claim 15, wherein the account identifier and the number are unrelated.

17. The method of claim 15, wherein the device is provided by a party to the transaction.

18. The method of claim 15, further comprising:
    the authenticating authority deriving an expected on-card clock value from the timestamp.

19. A non-transitory machine readable medium, executable by a machine, that includes program logic imprinted thereon for performing the method comprising:
    displaying, on a display of a payment card having an account identifier, a number that changes based on a clock for use in a transaction, the number generated by a computer processor transforming a value associated with the clock using a key of the payment card; and
    a device that receives only the account identifier and the number from the payment card and transmits the account identifier, the periodically changing number, and a timestamp of a transaction to an authenticating authority for authenticating the transaction;
    wherein the account identifier and the periodically changing number are received as separate numbers, and
    wherein the number comprises at least one digit that does not change.

20. The non-transitory machine readable medium of claim 19, wherein the account identifier and the number are unrelated.

21. The non-transitory machine readable medium of claim 19, wherein the device is provided by a party to the transaction.

22. The non-transitory machine readable medium of claim 19, wherein the authenticating authority derives an expected on-card clock value from the timestamp.

* * * * *